United States Patent
Hatakeyama et al.

(10) Patent No.: US 10,208,991 B2
(45) Date of Patent: Feb. 19, 2019

(54) HEAT PUMP DEVICE, AND AIR CONDITIONER, HEAT PUMP WATER HEATER, REFRIGERATOR AND FREEZING MACHINE INCLUDING HEAT PUMP DEVICE

(75) Inventors: Kazunori Hatakeyama, Tokyo (JP); Syota Kamiya, Tokyo (JP); Kenta Yuasa, Tokyo (JP); Shinya Matsushita, Tokyo (JP); Shinsaku Kusube, Tokyo (JP); Tsutomu Makino, Aichi (JP)

(73) Assignee: Mitsubishi Electric Corporation, Tokyo (JP)

( * ) Notice: Subject to any disclaimer, the term of this patent is extended or adjusted under 35 U.S.C. 154(b) by 776 days.

(21) Appl. No.: 14/364,353

(22) PCT Filed: Dec. 14, 2011

(86) PCT No.: PCT/JP2011/078973
§ 371 (c)(1),
(2), (4) Date: Jun. 11, 2014

(87) PCT Pub. No.: WO2013/088541
PCT Pub. Date: Jun. 20, 2013

(65) Prior Publication Data
US 2014/0338379 A1    Nov. 20, 2014

(51) Int. Cl.
*F25B 49/00* (2006.01)
*F25B 30/02* (2006.01)
(Continued)

(52) U.S. Cl.
CPC .............. *F25B 30/02* (2013.01); *F25B 31/02* (2013.01); *F25B 49/025* (2013.01);
(Continued)

(58) Field of Classification Search
CPC .... F25B 30/02; F25B 49/025; F25B 2400/01; F25B 2500/19; F25B 2500/27
(Continued)

(56) References Cited

U.S. PATENT DOCUMENTS 3,589,139 A * 6/1971 Arthur ................. B65D 88/745
                                                              307/129
4,006,603 A * 2/1977 Miles ................... B60H 1/3223
                                                               62/229
(Continued)

FOREIGN PATENT DOCUMENTS

JP            60-68341 U       5/1985
JP           61-091445 A       5/1986
(Continued)

OTHER PUBLICATIONS

Itami, T. and Okoma, K, and Misawa, K, "An Experimental Study of Frequency-Controlled Compressors", [online], 1982, pp. 297-304, International Compressor Engineering Conference, Paper No. 411, Purdue e-Pubs. [retrieved on Sep. 25, 2017]. Retrieved from internet <http://docs.lib.purdue.edu/cgi/viewcontent.cgi?article=1410&context=icec>.*

(Continued)

*Primary Examiner* — Ljiljana Ciric
(74) *Attorney, Agent, or Firm* — Posz Law Group, PLC

(57) ABSTRACT

A heat pump device includes an inverter control unit for controlling an inverter. The inverter control unit includes a constraint-energization control unit that, during operation standby of a compressor, determines whether heating to the compressor is necessary, on the basis of a refrigeration stagnation amount in the compressor, and, when having determined that heating to the compressor is necessary, selects, according to the refrigeration stagnation amount, any one of direct-current energization for supplying a direct-current voltage to the motor and high-frequency energiza- (Continued)

tion for supplying a high-frequency voltage having a frequency higher than a frequency during a normal operation to the motor, so as to output a constraint energization command for carrying out constraint energization of the motor; and a driving-signal generating unit that generates a driving signal on the basis of the constraint energization command.

14 Claims, 17 Drawing Sheets

(51) Int. Cl.
F25B 31/02 (2006.01)
F25B 49/02 (2006.01)
(52) U.S. Cl.
CPC ....... F25B 2400/01 (2013.01); F25B 2500/19 (2013.01); F25B 2500/27 (2013.01); F25B 2500/28 (2013.01); F25B 2600/021 (2013.01); Y02B 30/741 (2013.01)
(58) Field of Classification Search
USPC ...................................................... 62/228.1
See application file for complete search history.

(56) References Cited

U.S. PATENT DOCUMENTS

| | | | | |
|---|---|---|---|---|
| 4,151,725 | A * | 5/1979 | Kountz | F04D 27/0246 62/182 |
| 4,563,624 | A * | 1/1986 | Yu | F25B 49/025 307/64 |
| 4,810,943 | A * | 3/1989 | Kawaguchi | F25B 49/025 318/375 |
| 4,893,479 | A * | 1/1990 | Gillett | F25B 49/025 318/806 |
| 5,200,644 | A * | 4/1993 | Kobayashi | F25B 49/025 307/103 |
| 5,712,540 | A * | 1/1998 | Toda | F24F 11/0009 318/34 |
| 6,065,298 | A * | 5/2000 | Fujimoto | F24F 11/008 62/129 |
| 6,314,750 | B1 * | 11/2001 | Ishikawa | B60H 1/00921 62/129 |
| 6,508,072 | B1 * | 1/2003 | Kanazawa | F04B 49/20 236/78 D |
| 6,513,341 | B2 * | 2/2003 | Nakajima | B60H 1/3222 62/228.4 |
| 7,239,102 | B2 | 7/2007 | Fujimura | |
| 7,930,895 | B2 * | 4/2011 | Kim | F24F 11/008 361/22 |
| 8,245,523 | B2 * | 8/2012 | Lee | F24F 1/20 363/40 |
| 9,618,249 | B2 * | 4/2017 | Hatakeyama | F25B 49/025 |
| 9,657,980 | B2 * | 5/2017 | Song | F25B 49/025 |
| 9,746,216 | B2 * | 8/2017 | Yamakawa | F25B 30/02 |
| 2003/0000236 | A1 * | 1/2003 | Anderson | B60H 1/00421 62/228.3 |
| 2003/0182956 | A1 * | 10/2003 | Kurita | F25B 49/025 62/228.1 |
| 2004/0172960 | A1 * | 9/2004 | Nakamura | B60H 1/3205 62/228.1 |
| 2005/0247073 | A1 * | 11/2005 | Hikawa | F04B 49/065 62/228.1 |
| 2006/0150651 | A1 * | 7/2006 | Goto | H02P 6/18 62/228.1 |
| 2006/0162427 | A1 * | 7/2006 | Horie | F25B 49/005 73/40.7 |
| 2007/0101735 | A1 * | 5/2007 | Matsui | F25B 9/06 62/160 |
| 2008/0174393 | A1 * | 7/2008 | Schnetzka | F25B 49/025 336/57 |
| 2010/0232983 | A1 * | 9/2010 | Maeda | F04B 49/06 417/53 |
| 2011/0031919 | A1 * | 2/2011 | Green | H02P 21/0089 318/432 |
| 2011/0083467 | A1 * | 4/2011 | Asano | F25B 49/025 62/498 |
| 2012/0096881 | A1 * | 4/2012 | Sakanobe | F25B 49/025 62/126 |
| 2012/0111043 | A1 * | 5/2012 | Hatakeyama | F04C 29/0085 62/190 |
| 2012/0234031 | A1 * | 9/2012 | Hatakeyama | F25B 49/025 62/129 |
| 2013/0025307 | A1 * | 1/2013 | Okamoto | F25B 9/06 62/126 |
| 2013/0152609 | A1 | 6/2013 | Hatakeyama et al. | |
| 2013/0180273 | A1 * | 7/2013 | Hatakeyama | F04B 35/04 62/115 |
| 2013/0192294 | A1 * | 8/2013 | Yoo | F04B 49/02 62/510 |
| 2013/0269380 | A1 * | 10/2013 | Oya | F25B 41/043 62/190 |
| 2013/0291578 | A1 | 11/2013 | Hatakeyama et al. | |
| 2014/0020411 | A1 * | 1/2014 | Li | F25B 49/025 62/56 |
| 2014/0174118 | A1 * | 6/2014 | Shinomoto | H02M 7/53871 62/324.1 |
| 2015/0027138 | A1 * | 1/2015 | Schuster | F25B 49/02 62/56 |
| 2015/0056059 | A1 * | 2/2015 | Crane | F25B 1/053 415/1 |
| 2015/0075195 | A1 * | 3/2015 | Suzuki | H02P 6/18 62/157 |
| 2015/0075198 | A1 * | 3/2015 | Amakawa | F25B 49/022 62/236 |
| 2015/0089972 | A1 * | 4/2015 | Kamiya | F25B 13/00 62/467 |
| 2015/0168033 | A1 * | 6/2015 | Yamakawa | H02P 27/02 62/324.6 |
| 2015/0184904 | A1 * | 7/2015 | Okada | F25B 27/00 62/323.1 |
| 2015/0184913 | A1 * | 7/2015 | Hashimoto | F25B 49/025 62/228.1 |
| 2015/0354870 | A1 * | 12/2015 | Lee | F25B 31/02 62/498 |
| 2015/0354880 | A1 * | 12/2015 | Park | F25B 49/025 62/228.1 |
| 2015/0369497 | A1 * | 12/2015 | Kojima | F24F 5/001 62/228.1 |
| 2016/0061506 | A1 * | 3/2016 | Song | H02P 6/18 62/216 |
| 2016/0061507 | A1 * | 3/2016 | Penn, II | H02P 29/024 318/461 |
| 2016/0091237 | A1 * | 3/2016 | Uchida | F25B 49/025 62/230 |
| 2016/0245571 | A1 * | 8/2016 | Shinomoto | H02M 1/36 |
| 2017/0063275 | A1 * | 3/2017 | Park | H02P 29/62 |
| 2017/0211829 | A1 * | 7/2017 | Slack | F24F 11/006 |
| 2017/0229987 | A1 * | 8/2017 | Marcinkiewicz | H02P 6/21 |
| 2017/0229989 | A1 * | 8/2017 | Marcinkiewicz | H02P 21/22 |
| 2017/0254575 | A1 * | 9/2017 | Beckmann | F25D 11/00 |
| 2017/0257044 | A1 * | 9/2017 | Beckmann | H02P 6/24 |
| 2017/0261246 | A1 * | 9/2017 | Park | H02P 21/22 |

FOREIGN PATENT DOCUMENTS

| | | |
|---|---|---|
| JP | 05-034024 A | 2/1993 |
| JP | 05-288411 A | 11/1993 |
| JP | 07-337067 A | 12/1995 |
| JP | 08-226714 A | 9/1996 |
| JP | 11-159467 A | 6/1999 |
| JP | 2002-101683 A | 4/2002 |
| JP | 2003-189666 A | 7/2003 |
| JP | 2005-278393 A | 10/2005 |
| JP | 2007-166766 A | 6/2007 |
| JP | 2008-209036 A | 9/2008 |
| JP | 2010-210103 A | 9/2010 |
| JP | 2011-024377 A | 2/2011 |
| JP | 2011-038689 A | 2/2011 |
| JP | 2011-078296 A | 4/2011 |

(56) References Cited

FOREIGN PATENT DOCUMENTS

| WO | 99/29035 A1 | 6/1999 |
|---|---|---|
| WO | 2011/018863 A1 | 2/2011 |
| WO | 2011/074145 A1 | 6/2011 |

OTHER PUBLICATIONS

Gibson, Dr. J.P., "Part 1: Gibson/Speed Control of Refrigeration Compressors with Intelligent Frequency Inverters", [online], Jan. 2003, pp. 1-6, Publication in KI Luft- und Kaltetechnik. [retrieved on Sep. 25, 2017]. Retrieved from internet <http://www.frigokimo.com/fk/site/publication/kf1_2.pdf>.*

Bouchareb, M., "Part 3: Bouchareb/Speed Control of Refrigeration Compressors with Intelligent Frequency Inverters", [online], Sep. 2003, pp. 1-5, Publication in KI Luft- und Kaltetechnik. [retrieved on Sep. 25, 2017]. Retrieved from internet <http://www.enersys-group.com/archiv/Speed%20Control%20Refri%20Reduction%20of%20cost%20M.%20Bouchareb.pdf>.*

Office Action dated Mar. 31, 2015 in the corresponding JP application No. 2013-549013 (and English translation).

International Search Report of the International Searching Authority dated Mar. 13, 2012 for the corresponding international application No. PCT/JP2011/078973 (and English translation).

Office Action dated Apr. 7, 2016 in the corresponding Chinese Patent Application No. 2011800754573 (and English translation).

Office Action dated Aug. 4, 2015 in corresponding Australian patent application No. 2011383457.

Extended European Search report dated Aug. 9, 2015 in the corresponding EP application No. 11877449.6.

Office Action dated Dec. 8, 2015 in the corresponding JP application No. 2013-549013 (with English translation).

Office Action dated Oct. 26, 2016 issued in corresponding CN patent application No. 201180075457.3 (and partial English translation).

\* cited by examiner

FIG.6
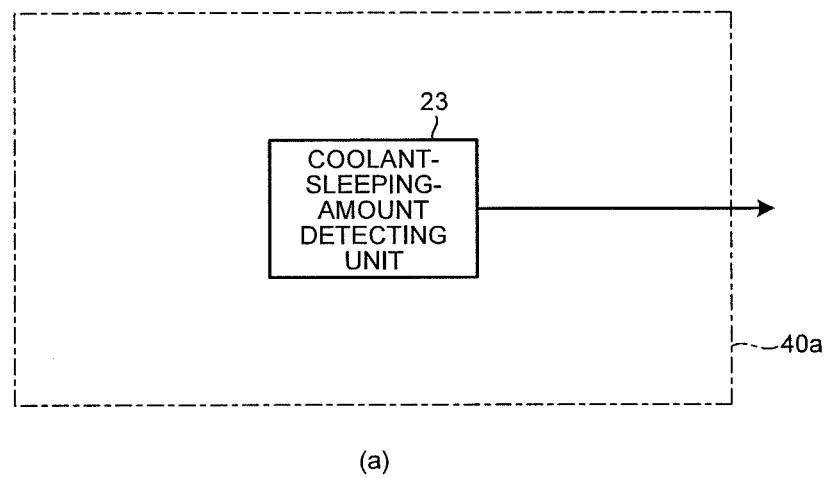
(a)
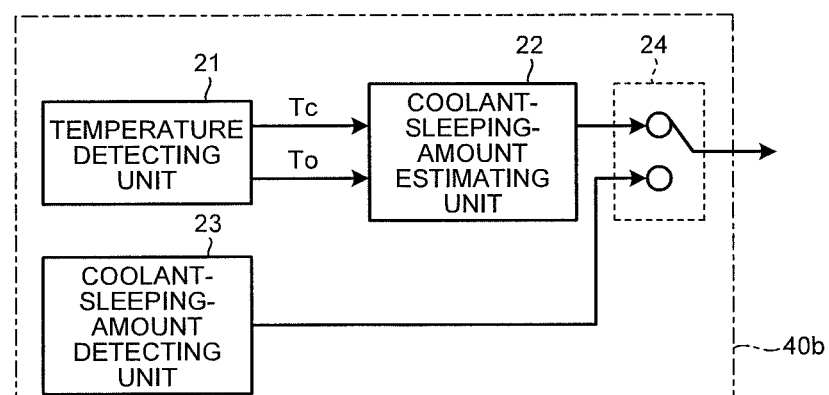
(b)

FIG.9

| VOLTAGE VECTOR | VOLTAGE DIRECTION | UP | VP | WP | UN | VN | WN |
|---|---|---|---|---|---|---|---|
| V0 | 0 | 0 | 0 | 0 | 1 | 1 | 1 |
| V1 | +W | 0 | 0 | 1 | 1 | 1 | 0 |
| V2 | +V | 0 | 1 | 0 | 1 | 0 | 1 |
| V3 | -U | 0 | 1 | 1 | 1 | 0 | 0 |
| V4 | +U | 1 | 0 | 0 | 0 | 1 | 1 |
| V5 | -V | 1 | 0 | 1 | 0 | 1 | 0 |
| V6 | -W | 1 | 1 | 0 | 0 | 0 | 1 |
| V7 | 0 | 1 | 1 | 1 | 0 | 0 | 0 |

FIG.18
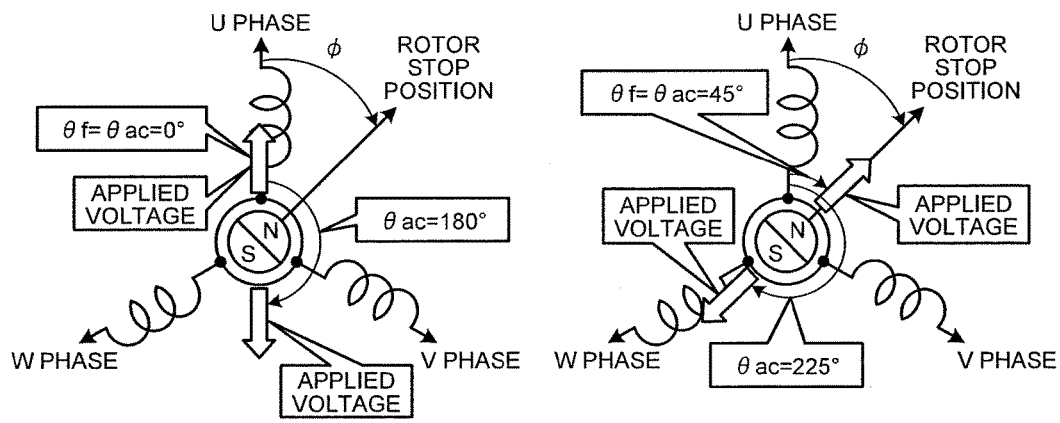
(a) θ f=0°
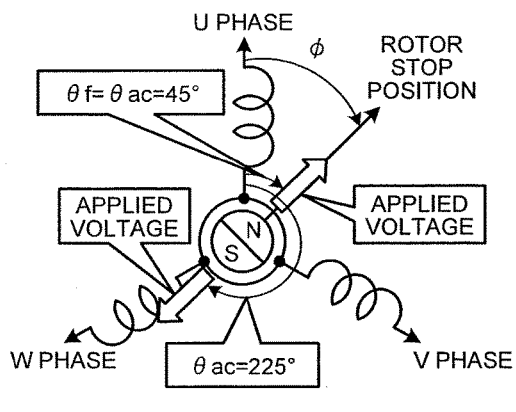
(b) θ f=45°
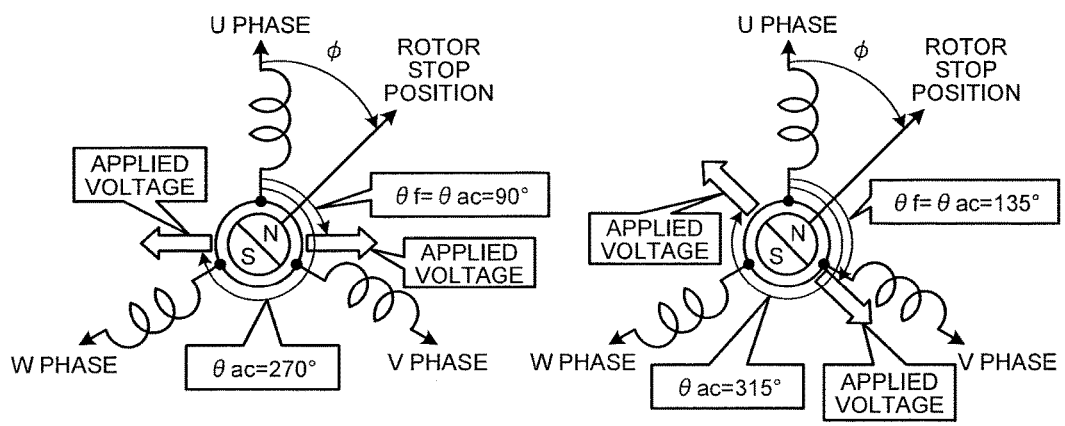
(c) θ f=90°
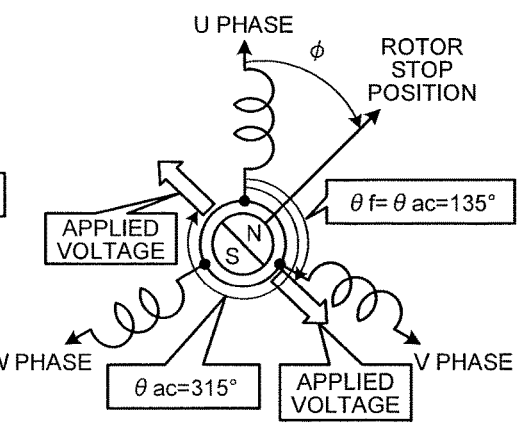
(d) θ f=135°

FIG.19
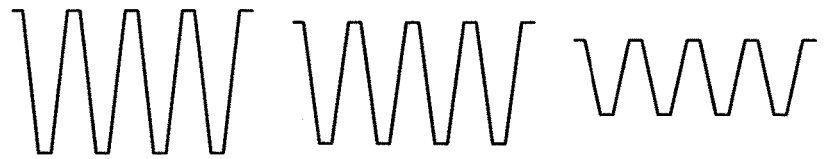
U PHASE
CURRENT
W PHASE
CURRENT
V PHASE
CURRENT
(a) θf=0°    (b) θf=30°    (c) θf=60°

HEAT PUMP DEVICE, AND AIR CONDITIONER, HEAT PUMP WATER HEATER, REFRIGERATOR AND FREEZING MACHINE INCLUDING HEAT PUMP DEVICE

CROSS REFERENCE TO RELATED APPLICATION

This application is a U.S. national stage application of PCT/JP2011/078973 filed on Dec. 14, 2011, the contents of which are incorporated herein by reference.

TECHNICAL FIELD

The present invention relates to a heat pump device, and an air conditioner, a heat pump water heater, a refrigerator and a freezing machine including the heat pump device.

BACKGROUND

As a technology for preventing a liquid coolant from being held up in a compressor during an operation stop of a heat pump device used in an air conditioner or the like, there has been a technology for energizing a motor winding wire without driving a motor in the compressor (hereinafter referred to as "constraint energization") and heating the compressor to thereby vaporizing and discharging the liquid coolant. For example, Patent Literature 1 discloses a technology for, when detecting that the ambient temperature of the air conditioner is in a low-temperature state, supplying a single-phase alternating-current voltage having a frequency of about 25 kilohertz higher than a normal frequency during a normal operation to the compressor, preventing the liquid coolant from being held up in the compressor to smooth lubricating action in the compressor while suppressing an excessive temperature rise and rotation of a rotating unit of the compressor.

Further, for example, Patent Literature 2 discloses a technology for feeding a direct current to the motor winding wire according to an outdoor air temperature to thereby performing preheating of the motor without rotating a rotor making use of a copper loss generated in the motor winding wire.

PATENT LITERATURE

Patent Literature 1: Japanese Patent Application Laid-Open No. S61-91445
Patent Literature 2: Japanese Patent Application Laid-Open No. 2007-166766

However, in the technology described in Patent Literature 1, because the high-frequency single-phase alternating-current voltage is supplied to the compressor, a total-off section in which all switching elements are turned off is generated relatively long. In such a total-off section, an electric current is regenerated to a direct-current power supply via a reflux diode. Therefore, there is a problem in that a high-frequency current cannot be efficiently fed to the motor and heating efficiency of the compressor is deteriorated. When a small motor having a small copper loss is used, a heat value with respect to an applied voltage is small. Therefore, there is a problem in that a necessary heating amount cannot be obtained with a voltage within a usable range.

When the direct current is fed to the motor winding wire to perform the preheating of the motor as described in Patent Literature 3, a heat value is obtained as a product of a winding resistance and a square of the electric current. However, because the winding resistance of the motor tends to be small according to high-efficiency design of the motor in recent years, to obtain a sufficient heating amount, it is necessary to increase the electric current flowing to the motor by a decrease in the winding resistance. Therefore, there is a problem in that an electric current flowing to an inverter also increases, a loss of the inverter increases, and the heating efficiency of the compressor is deteriorated.

SUMMARY

The present invention has been devised in view of the above and it is an object of the present invention to provide a heat pump device capable of efficiently carrying out heating to a compressor according to a necessary heating amount, surely preventing a coolant from being held up in the compressor, and attaining a reduction in standby power and an air conditioner, a heat pump water heater, a refrigerator, and a freezing machine including the heat pump device.

The present invention is directed to a heat pump device that achieves the object. The heat pump device includes a compressor including a compression mechanism that compresses a coolant and a motor that drives the compression mechanism; a heat exchanger; an inverter that applies a predetermined voltage to the motor; and an inverter control unit that generates a driving signal for driving the inverter. The inverter control unit includes a constraint-energization control unit that, during operation standby of the compressor, determines whether heating to the compressor is necessary, on the basis of a refrigeration stagnation amount in the compressor, and, when having determined that heating to the compressor is necessary, selects, according to the refrigeration stagnation amount, any one of direct-current energization for supplying a direct-current voltage to the motor and high-frequency energization for supplying a high-frequency voltage having a frequency higher than a frequency during a normal operation to the motor, so as to output a constraint energization command for carrying out constraint energization of the motor; and a driving-signal generating unit that generates a driving signal on the basis of the constraint energization command.

According to the present invention, there is an effect that it is possible to efficiently carry out heating to a compressor according to a necessary heating amount, surely prevent a coolant from being held up in the compressor, and attain a reduction in standby power.

BRIEF DESCRIPTION OF DRAWINGS

FIG. 6 is a diagram of another configuration example of a refrigeration stagnation amount output unit in the heat pump device according to the first embodiment.

FIG. 9 is a diagram of eight switching patterns in the heat pump device according to the first embodiment.

FIG. 18 is a diagram of an applied voltage applied when a reference phase θf is changed.

FIG. 19 is a diagram of phase current waveforms obtained when the reference phase θf is 0°, 30°, and 60°.

DETAILED DESCRIPTION

A heat pump device and an air conditioner, a heat pump water heater, a refrigerator, and a freezing machine including the heat pump device according to embodiments of the present invention are explained below with reference to the accompanying drawings. Note that the present invention is not limited by the embodiments explained below.

First Embodiment

Figure 1:
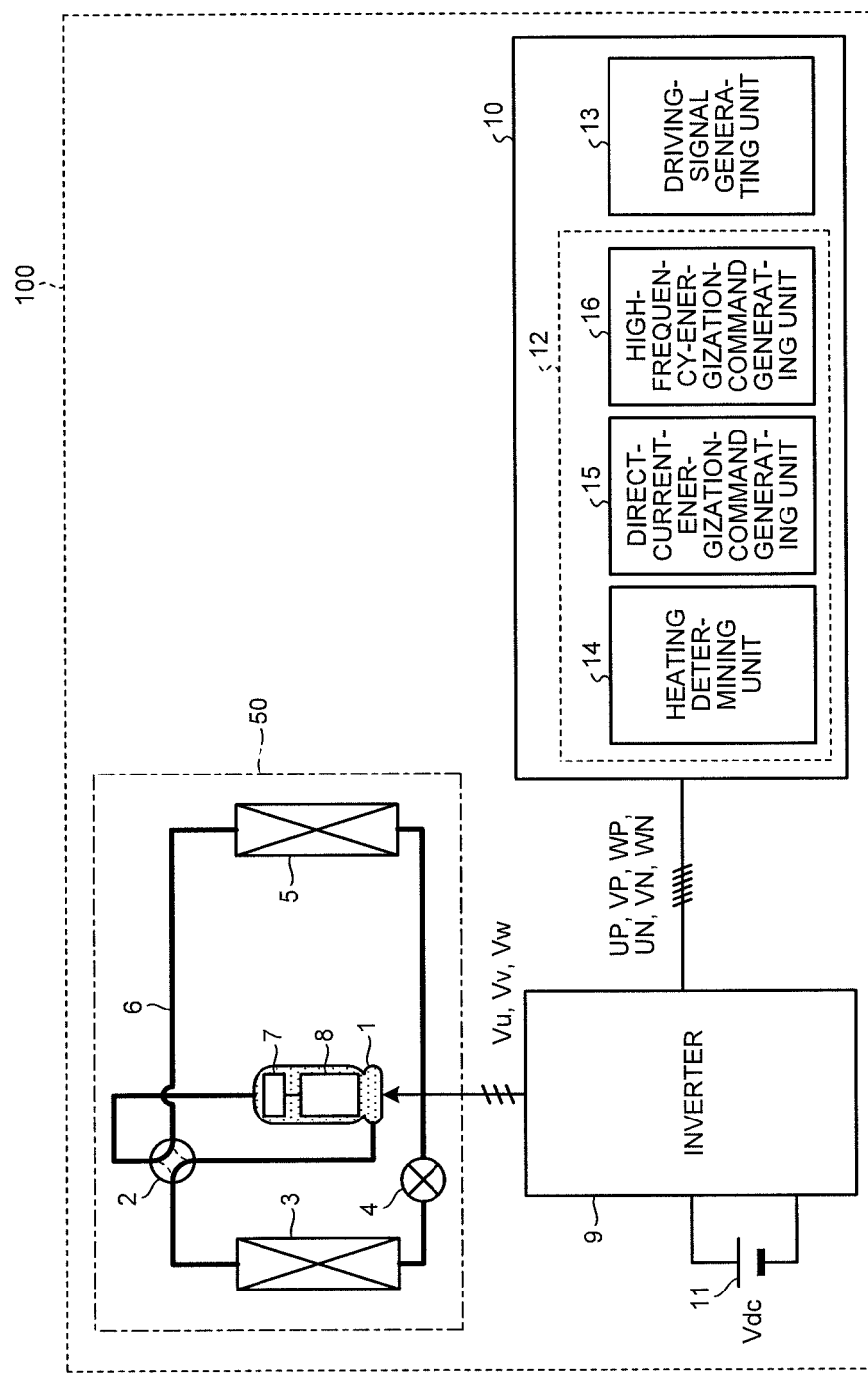
FIG. 1 is a diagram of a configuration example of a heat pump device according to a first embodiment.

FIG. 1 is a diagram of a configuration example of a heat pump device according to a first embodiment. As shown in FIG. 1, in a heat pump device 100 according to the first embodiment, a compressor 1, a four-way valve 2, a heat exchanger 3, an expansion mechanism 4, and a heat exchanger 5 are sequentially connected via a coolant pipe 6 to form a refrigerating cycle 50. Note that, in the example shown in FIG. 1, a basic configuration forming the refrigerating cycle 50 is shown. A part of components are omitted.

A compression mechanism 7 that compresses a coolant and a motor 8 that causes the compression mechanism 7 to operate are provided on the inside of the compressor 1. The motor 8 is a three-phase motor including winding wires of three phases of a U phase, a V phase, and a W phase.

An inverter 9 is electrically connected to the motor 8. The inverter 9 is connected to a direct-current voltage source 11 and applies voltages Vu, Vv, and Vw respectively to the winding wires of the U phase, the V phase, and the W phase of the motor 8 using, as a power supply, a direct-current voltage (a bus voltage) Vdc supplied from the direct-current voltage source 11.

An inverter control unit 10 is electrically connected to the inverter 9. The inverter control unit 10 outputs a driving signal for driving the inverter 9 to the inverter 9. The inverter control unit 10 has two operation modes, i.e., a normal operation mode and a heating operation mode.

In the normal operation mode, the inverter control unit 10 generates and outputs a PWM (Pulse Width Modulation) signal (a driving signal) for driving to rotate the motor 8. In the heating operation mode, unlike the normal operation mode, the inverter control unit 10 energizes the motor 8 not to be driven to rotate during operation standby to thereby perform heating of the motor and warms, vaporizes, and discharges a liquid coolant held up in the compressor 1. In the heating operation mode, the inverter control unit 10 feeds a direct current or a high-frequency current, which the motor 8 cannot follow, to the motor 8 to thereby heat the liquid coolant held up in the compressor 1 making use of heat generated in the motor 8. In this embodiment, energizing the motor 8 not to be driven to rotate and performing heating in the heating operation mode is hereinafter referred to as "constraint energization". Note that feeding the direct current to the motor 8 and carrying out the constraint energization is herein after referred to as "direct-current energization". Feeding the high-frequency current to the motor 8 and carrying out the constraint energization is hereinafter referred to as "high-frequency energization". In this embodiment, components and operations for realizing the heating operation mode are hereinafter explained.

The inverter control unit 10 includes a constraint-energization control unit 12 and a driving-signal generating unit 13 as components for realizing the heating operation mode. The constraint-energization control unit 12 includes a heating determining unit 14, a direct-current-energization-command generating unit 15, and a high-frequency-energization-command generating unit 16. In the figure, a part of components for realizing the normal operation mode are omitted.

Figure 2:
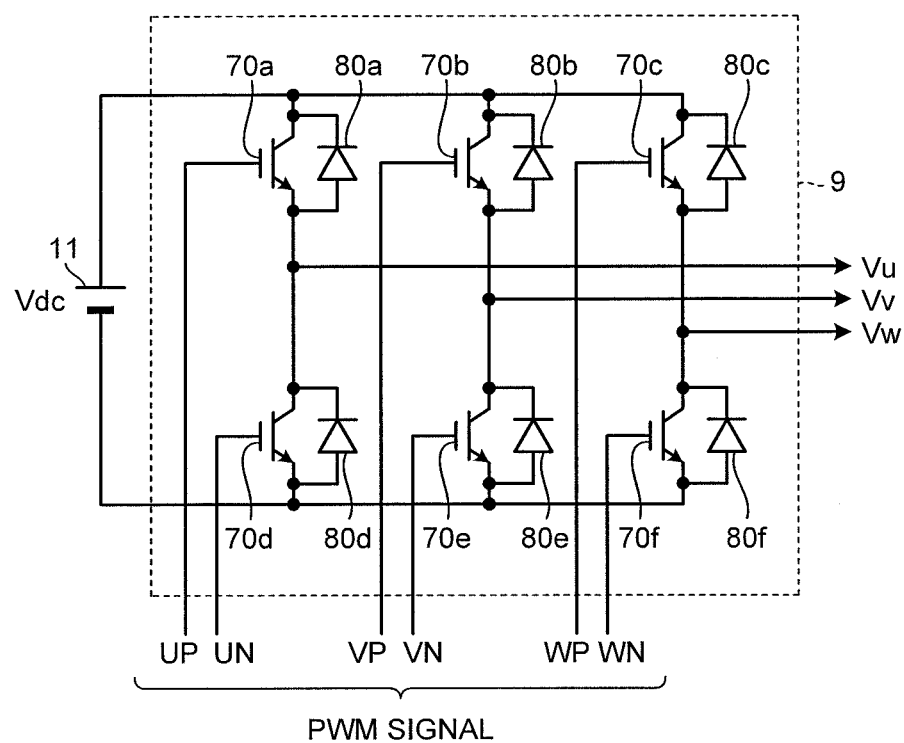
FIG. 2 is a diagram of a configuration example of an inverter in the heat pump device according to the first embodiment.

FIG. 2 is a diagram of a configuration example of the inverter 9 in the heat pump device according to the first embodiment. As shown in FIG. 2, the inverter 9 includes bridge-connected switching elements 70a to 70f and reflux diodes 80a to 80f respectively connected to the switching elements 70a to 70f in parallel. The inverter 9 is connected to the direct-current voltage source 11. The switching elements respectively corresponding to PWM signals (UP, VP, WP, UN, VN, and WN) sent from the inverter control unit 10 (UP corresponds to the switching element 70a, the VP corresponds to the switching element 70b, WP corresponds to the switching element 70c, UN corresponds to the switching element 70d, VN corresponds to the switching element 70e, and WN corresponds to the switching element 70f) are driven by the PWM signals. The inverter 9 generates voltages Vu, Vv, and Vw respectively applied to the winding wires of the U phase, the V phase, and the W phase of the motor 8 using the bus voltage Vdc as a power supply.

Figure 3:
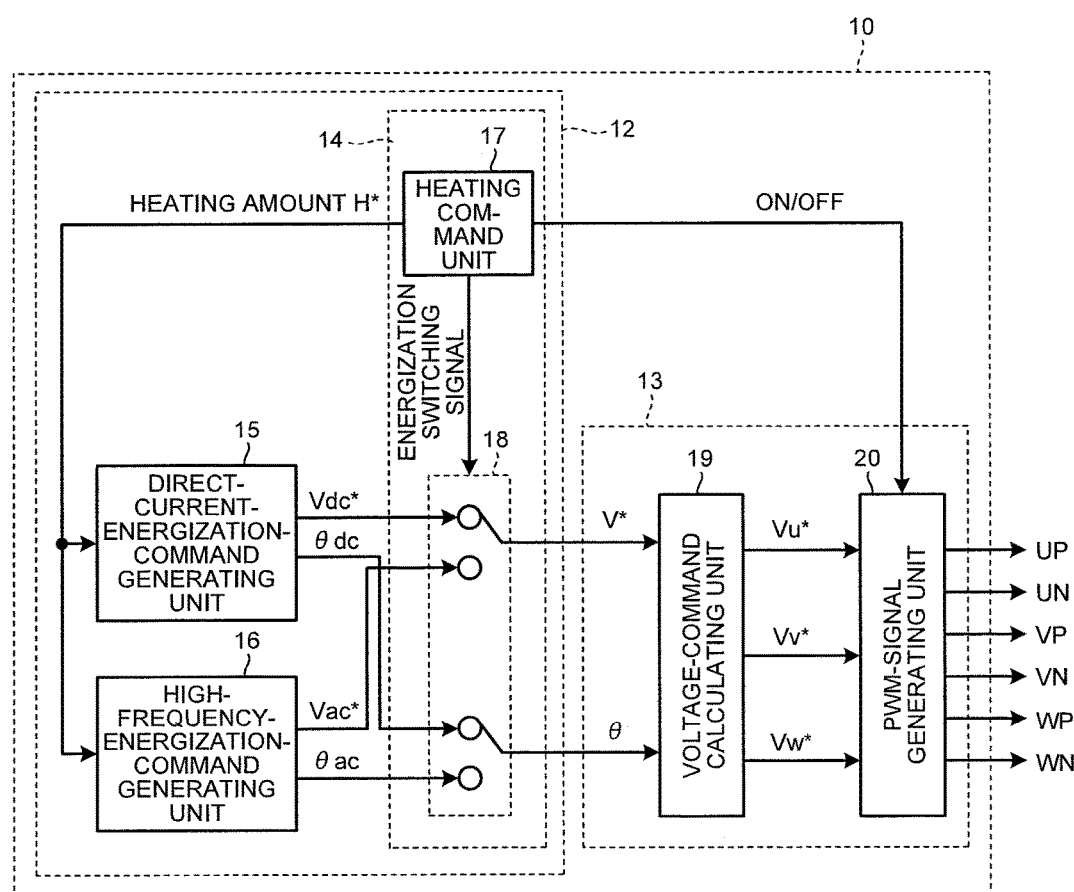
FIG. 3 is a diagram of a configuration example of an inverter control unit in the heat pump device according to the first embodiment.

FIG. 3 is a diagram of a configuration example of an inverter control unit according to the first embodiment. As explained above, the inverter control unit 10 includes the constraint-energization control unit 12 including the heating determining unit 14, the direct-current-energization-command generating unit 15, and the high-frequency-energization-command generating unit 16 and the driving-signal generating unit 13. The heating determining unit 14 includes a heating command unit 17 and an energization switching unit 18. The driving-signal generating unit 13 includes a voltage-command calculating unit 19 and a PWM-signal generating unit 20.

The direct-current-energization-command generating unit 15 generates a direct-current energization command including a direct-current voltage command Vdc* and a direct-current voltage phase command θdc on the basis of a heating amount H* output from the heating command unit 17. The high-frequency-energization-command generating unit 16 generates a high-frequency energization command including a high-frequency voltage command Vac* and a high-frequency voltage phase command θac on the basis of the heating amount H* output from the heating command unit 17.

The heating command unit 17 estimates a sleeping amount of the liquid coolant held up in the compressor 1 and outputs heating necessity to the driving-signal generating unit 13. The heating command unit 17 calculates the heating amount H* necessary for ejection of the liquid coolant and outputs the heating amount H* to the direct-current-energization-command generating unit 15 and the high-frequency-energization-command generating unit 16. The heating command unit 17 outputs, to the energization switching unit 18, an energization switching signal for switching the direct-current energization command including the direct-current voltage command Vdc* and the direct-current voltage phase command θdc, which are the outputs of the direct-current-energization-command generating unit 15, and the high-frequency energization command including the high-frequency voltage command Vac* and the high-frequency voltage phase command θac, which are the outputs of the high-frequency-energization-command generating unit 16.

The energization switching unit 18 selects any one of the direct-current voltage command Vdc* and the direct-current voltage phase command θdc and the high-frequency voltage command Vac* and the high-frequency voltage phase command θac, that is, any one of a direct-current energization command and a high-frequency energization command and outputs the energization command to the driving-signal generating unit 13 as a constraint energization command including a voltage command V* and a voltage phase command θ.

The voltage-command calculating unit 19 generates voltage commands Vu*, Vv*, and Vw* of the three phases (the U phase, the V phase, and the W phase) on the basis of the voltage command V* and the voltage phase command θ. The PWM-signal generating unit 20 generates, on the basis of the three-phase voltage commands Vu*, Vv*, and Vw* and the bus voltage Vdc, the PWM signals (UP, VP, WP, UN, VN, and WN) for driving the inverter 9.

A detailed configuration and a detailed operation of the constraint-energization control unit 12 in the heat pump device 100 according to the first embodiment are explained with reference to FIG. 4 to FIG. 6.

Figure 4:
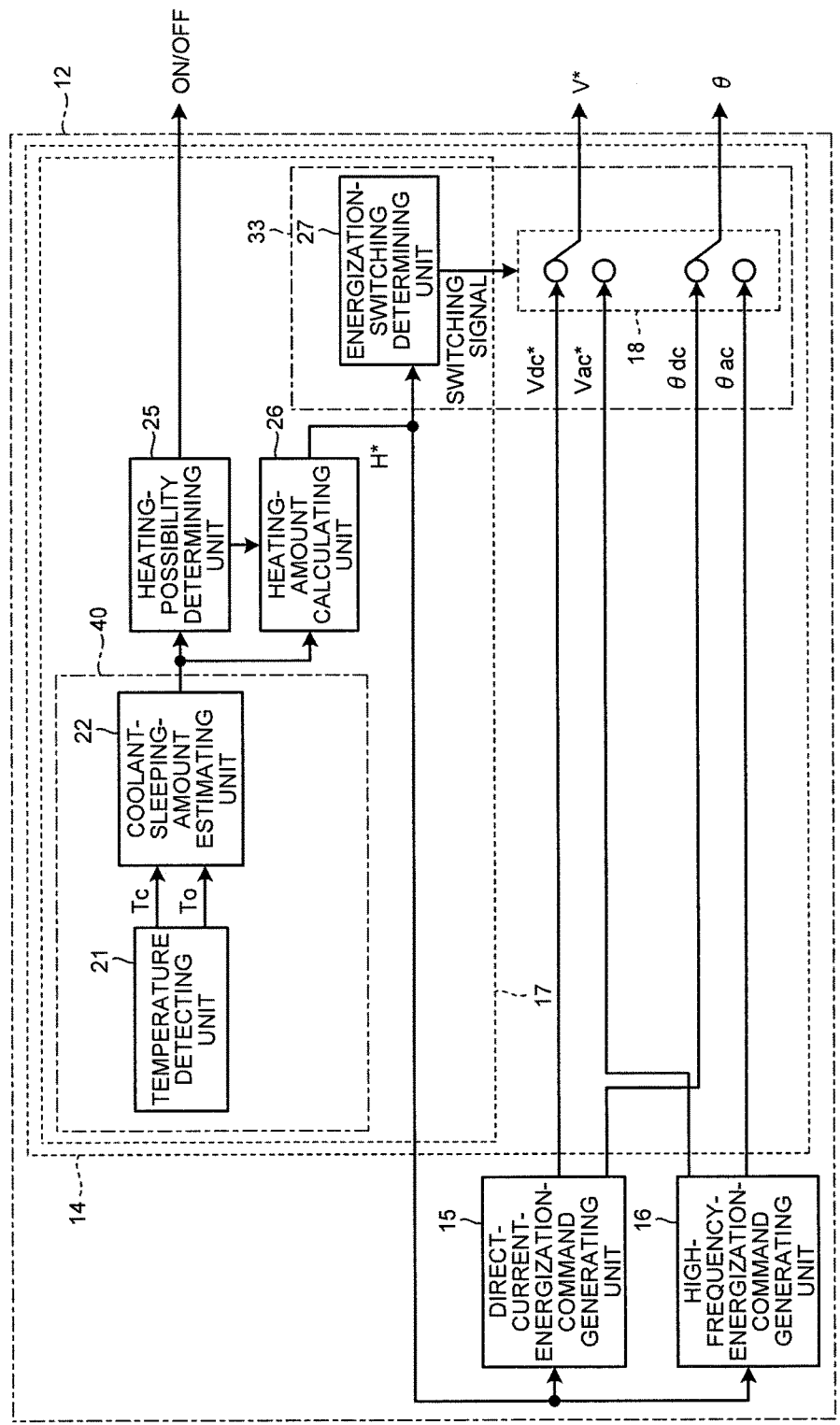
FIG. 4 is a diagram of a configuration example of a constraint-energization control unit in the heat pump device according to the first embodiment.
Figure 5:
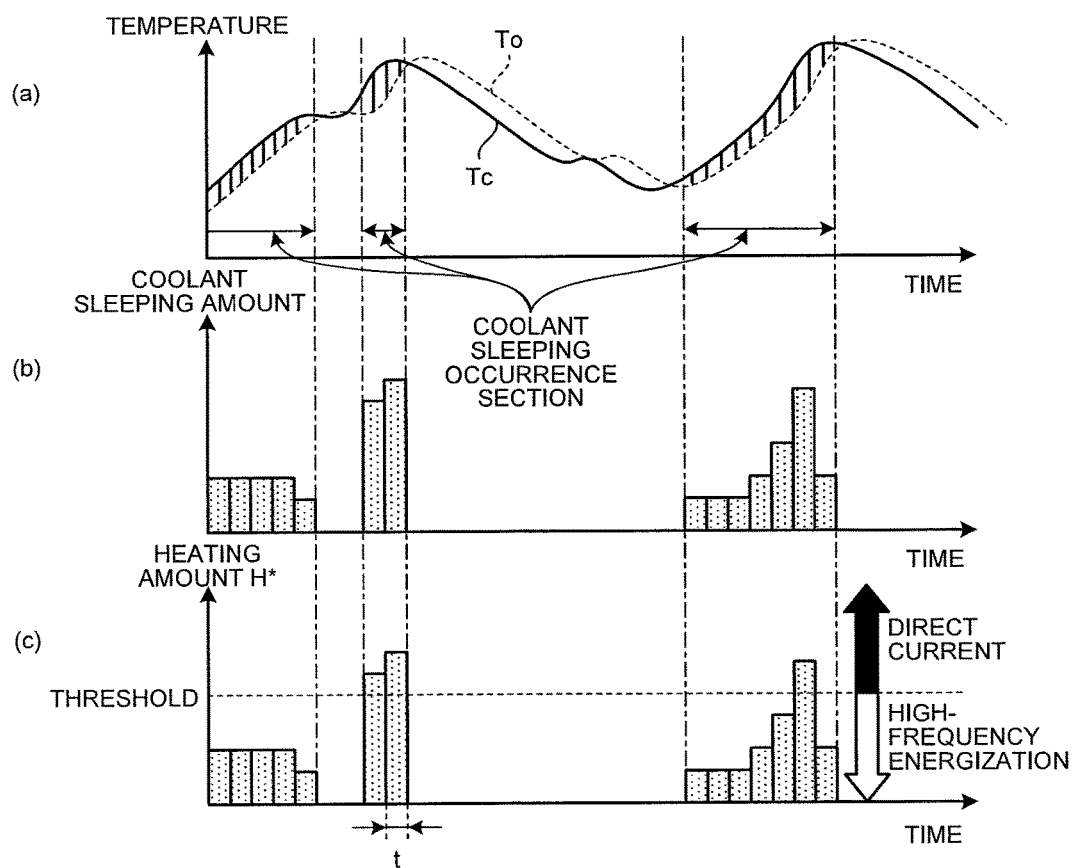
FIG. 5 is a diagram for explaining the operation of a heating determining unit in the heat pump device according to the first embodiment.

FIG. 4 is a diagram of a configuration example of the constraint-energization control unit in the heat pump device according to the first embodiment. FIG. 5 is a diagram for explaining the operation of the heating determining unit in the heat pump device according to the first embodiment. FIG. 5(*a*) shows a relation between time and an atmospheric temperature Tc around the compressor 1 (e.g., an outdoor air temperature) and temperature To of the compressor 1 (a compressor temperature). FIG. 5(*b*) shows a refrigeration stagnation amount per unit time. FIG. 5(*c*) shows the heating amount H* per unit time. FIG. 6 is a diagram of another configuration example of the refrigeration stagnation amount output unit in the heat pump device according to the first embodiment.

As explained above, the constraint-energization control unit 12 includes the heating determining unit 14, the direct-current-energization-command generating unit 15, and the high-frequency-energization-command generating unit 16. The heating determining unit 14 includes the heating command unit 17 and the energization switching unit 18. As shown in FIG. 4, the heating command unit 17 includes a refrigeration stagnation amount output unit 40, a heating-necessity determining unit 25, a heating-amount calculating unit 26, and an energization-switching determining unit 27. The refrigeration stagnation amount output unit 40 includes a temperature detecting unit 21 and a refrigeration stagnation amount estimating unit 22. The energization switching unit 18 and the energization-switching determining unit 27 configure an energization-switching control unit 33.

The temperature detecting unit 21 detects the atmospheric temperature Tc around the compressor 1 (e.g., the outdoor temperature) and the temperature To of the compressor 1 (the compressor temperature). The refrigeration stagnation amount estimating unit 22 estimates, on the basis of the atmospheric temperature Tc and the compressor temperature To, a sleeping amount of the liquid coolant held up in the compressor 1. The coolant circulating in the refrigerating cycle 50 condenses and accumulates in a place where the temperature is the lowest among the components forming the refrigerating cycle 50. The compressor 1 has the largest heat capacity among the components forming the refrigerating cycle 50. Therefore, as shown in FIG. 5(*a*), the compressor temperature To rises later than a rise of the atmospheric temperature Tc. The compressor 1 has the lowest temperature. Therefore, the liquid coolant is held up on the inside of the compressor 1. In this embodiment, the refrigeration stagnation amount estimating unit 22 estimates a refrigeration stagnation amount per unit time t, as shown in FIG. 5(*b*), on the basis of, for example, a relation between the atmospheric temperature Tc and the compressor temperature To obtained by an experiment or the like in advance. Note that, when a heat capacity of the compressor 1 is grasped in advance, it is possible to estimate the refrigeration stagnation amount per unit time t, by detecting only the atmospheric temperature Tc and estimating to which degree the compressor temperature To changes later than a change of the atmospheric temperature Tc. In this case, it is possible to reduce a sensor for detecting the compressor temperature To and reduce costs. It goes without saying that it is also possible to estimate the refrigeration stagnation amount per unit time t, by detecting, instead of the atmospheric temperature Tc, the temperature of the heat exchanger 3 or the like having a heat capacity smaller than the heat capacity of the compressor 1 among the components forming the refrigerating cycle 50.

As shown in FIG. 6(*a*), in a refrigeration stagnation amount output unit 40*a*, a refrigeration stagnation amount detecting unit 23 that detects a refrigeration stagnation amount in the compressor 1 is provided instead of the temperature detecting unit 21 and the refrigeration stagnation amount estimating unit 22 explained with reference to FIG. 5. When the refrigeration stagnation amount is detected more directly in this way, it is possible to grasp a more accurate refrigeration stagnation amount. Note that, as a sensor for detecting a refrigeration stagnation amount in the compressor 1, there are, for example, a capacitance sensor for measuring a liquid amount and a sensor for measuring a distance between an upper part of the compressor 1 and a liquid surface of the coolant using laser, sound, an electromagnetic wave, or the like. As shown in FIG. 6(b), a refrigeration stagnation amount output unit 40b including the temperature detecting unit 21, the refrigeration stagnation amount estimating unit 22, the refrigeration stagnation amount detecting unit 23, and a refrigeration stagnation determination switching unit 24 can be provided to select any one of an estimated value and a detected value of a refrigeration stagnation amount. Further, subsequent control can be performed using both of the estimated value and the detected value of the refrigeration stagnation amount.

The heating-necessity determining unit 25 determines necessity of heating to the compressor 1 on the basis of refrigeration stagnation amount, which is the output of the refrigeration stagnation amount output unit 40 (or 40a or 40b). When the heating to the compressor 1 is necessary, that is, the liquid coolant is held up in the compressor 1 or when it is estimated that the liquid coolant is held up in the compressor 1, the heating-necessity determining unit 25 outputs an ON signal to the PWM-signal generating unit 20 and instructs the heating-amount calculating unit 26 to start calculation of the heating amount H* necessary for ejecting the liquid coolant held up in the compressor 1. When the heating to the compressor 1 is unnecessary, that is, the liquid coolant is not held up in the compressor 1 or when it is estimated that the liquid coolant is not held up in the compressor 1, the heating-necessity determining unit 25 outputs an OFF signal to the PWM-signal generating unit 20.

When instructed to start the calculation of the heating amount H* by the heating-necessity determining unit 25, the heating-amount calculating unit 26 calculates, according to the refrigeration stagnation amount, which is the output of the refrigeration stagnation amount output unit 40 (or 40a or 40b), the heating amount H* necessary for ejecting the liquid coolant held up in the compressor 1 and outputs the heating amount H* to the direct-current-energization-command generating unit 15, the high-frequency-energization-command generating unit 16, and the energization-switching determining unit 27. The heating amount H* changes according to the type and the size of the compressor 1. When the compressor 1 is large or is made of a material or in a shape that does not allow heat to be easily transferred, the heating amount H* only has to be set high.

As shown in FIG. 5(c), the energization-switching determining unit 27 has a threshold for determining in advance whether the direct-current energization is performed or the high-frequency energization is performed. The energization-switching determining unit 27 controls the energization switching unit 18 on the basis of whether the heating amount H* is equal to or larger than the threshold or smaller than the threshold. When the heating amount H* is equal to or larger than the threshold, the energization-switching determining unit 27 controls the energization switching unit 18 to select the direct-current voltage Vdc* and the direct-current voltage phase command θdc output from the direct-current-energization-command generating unit 15 (hereinafter referred to as "select the direct-current energization") and output the direct-current voltage Vdc* and the direct-current voltage phase command θdc as the voltage command V* and the voltage phase command θ. When the heating amount H* is smaller than the threshold, the energization-switching determining unit 27 controls the energization switching unit 18 to select the high-frequency voltage command Vac* and the high-frequency voltage phase command θac output from the high-frequency-energization-command generating unit 16 (hereinafter referred to as "select the high-frequency energization") and output the high-frequency voltage command Vac* and the high-frequency voltage phase command θac as the voltage command V* and the voltage phase command θ.

Figure 7:
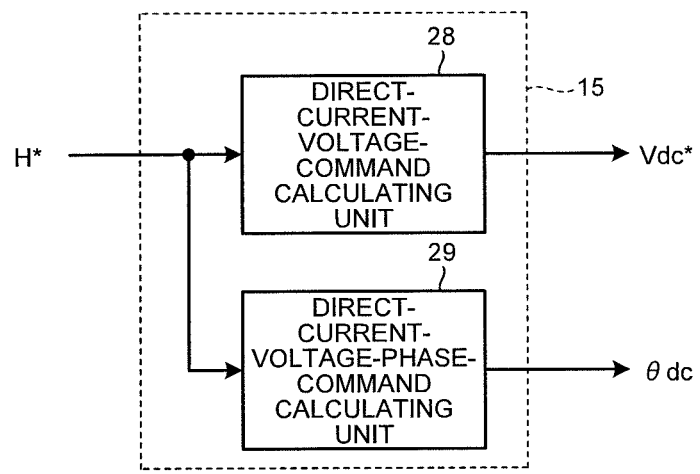
FIG. 7 is a diagram of a configuration example of a direct-current-energization-command generating unit in the heat pump device according to the first embodiment.

A detailed configuration and a detailed operation of the direct-current-energization-command generating unit 15 in the heat pump device according to the first embodiment are explained with reference to FIG. 7. FIG. 7 is a diagram of a configuration example of the direct-current-energization-command generating unit in the heat pump device according to the first embodiment. As shown in FIG. 7, the direct-current-energization-command generating unit 15 includes a direct-current-voltage-command calculating unit 28 and a direct-current-voltage-phase-command calculating unit 29.

The direct-current-voltage-command calculating unit 28 stores a relation between the heating amount H* and the direct-current voltage command Vdc* as table data in advance. The direct-current-voltage-command calculating unit 28 calculates the direct-current voltage command Vdc* according to the heat amount H* input from the heating-amount calculating unit 26 and outputs the direct-current voltage command Vdc*. Note that, in the example explained above, heating amount H* is input. However, it goes without saying that it is also possible to improve reliability of the direct-current voltage command Vdc* using various data such as the atmospheric temperature (e.g., the outdoor temperature) Tc around the compressor 1, the compressor temperature To, and information concerning the structure of the compressor 1.

The direct-current-voltage-phase-command calculating unit 29 calculates the direct-current voltage phase command θdc for energizing the motor 8. The direct-current-voltage-phase-command calculating unit 29 sets the direct-current voltage phase command θdc to a fixed value to apply a direct-current voltage. For example, when the motor 8 is energized in a position of 0° of the motor 8, the direct-current-voltage-phase-command calculating unit 29 outputs θdc=0. However, when continuous energization is performed with the fixed value, only a specific portion of the motor 8 generates heat. Therefore, in this embodiment, the direct-current voltage phase command θdc is changed according to elapse of time to uniformly heat the motor 8.

Figure 8:
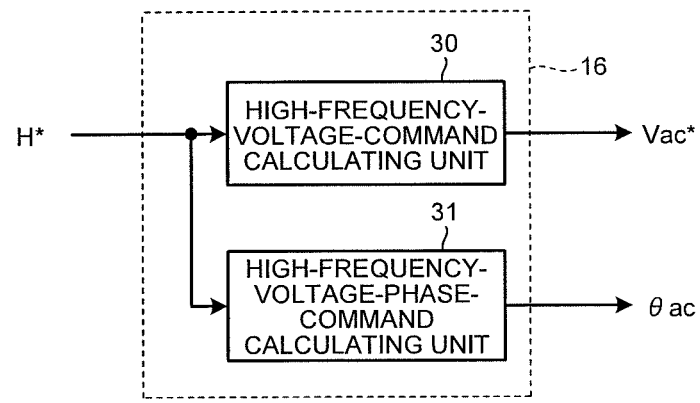
FIG. 8 is a diagram of a configuration example of a high-frequency-energization-command generating unit in the heat pump device according to the first embodiment.

A detailed configuration and a detailed operation of the high-frequency-energization-command generating unit 16 in the heat pump device according to the first embodiment are explained with reference to FIG. 8. FIG. 8 is a diagram of a configuration example of the high-frequency-energization-command generating unit in the heat pump device according to the first embodiment. The high-frequency-energization-command generating unit 16 includes a high-frequency-voltage-command calculating unit 30 and a high-frequency-voltage-phase-command calculating unit 31.

The high-frequency-voltage-command calculating unit 30 stores a relation between the heating amount H* and the high-frequency voltage command Vac* as table data in advance. The high-frequency-voltage-command calculating unit 30 calculates the high-frequency voltage command Vac* according to the heating amount H* input from the heating-amount calculating unit 26 and outputs the high-frequency voltage command Vac*. Note that, in the example explained above, the heating amount H* is input. However, as in the direct-current-voltage-command calculating unit 28, it goes without saying that it is also possible to improve reliability of the high-frequency voltage command Vac using various data such as the atmospheric temperature (e.g., the outdoor temperature) Tc around the compressor 1, the compressor temperature To, and information concerning the structure of the compressor 1.

The high-frequency-voltage-phase-command calculating unit 31 calculates the high-frequency voltage phase command θac for energizing the motor 8. The high-frequency-voltage-phase-command calculating unit 31 continuously changes the high-frequency voltage phase command θac in a range of 0° to 360° to apply a high-frequency voltage. It is possible to increase the frequency of the high-frequency voltage by reducing a cycle of a change of the high-frequency voltage phase command θac in the range of 0° to 360°.

The aim of switching the direct-current energization and the high-frequency energization according to a heating amount in the heat pump device 100 according to the first embodiment is explained.

In the case of the direct-current energization, by feeding a direct current Idc to the motor 8, a copper loss proportional to resistance R of a winding wire configuring the motor 8 and the direct current Idc is generated in the winding wire of the motor 8. Consequently, it is possible to heat the liquid coolant held up in the motor 8.

By driving the inverter 9 to increase the direct current Idc, it is possible to obtain a large heat value. Therefore, it is possible to discharge, in a short time, the liquid coolant held up in the compressor 1. However, in a motor in recent years, a resistance value of a winding wire tends to be small according to high-efficiency design. Therefore, because the resistance value of the winding wire is smaller than that in the past, to obtain a sufficient heating amount, it is necessary to increase the direct current Idc. Therefore, a loss of the inverter 9 increases, heating efficiency of the motor 8 is deteriorated, and power consumption increases. Therefore, this is not an energization method suitable for performing coolant heating for a long time during operation standby.

On the other hand, in the case of the high-frequency energization, by feeding a high-frequency current Iac to the motor 8 with the inverter 9, an iron loss such as an eddy current loss or a hysteresis loss is generated in a rotor configuring the motor 8 and a magnetic body, which is a material of the rotor. Consequently, it is possible to heat the liquid coolant held up in the motor 8.

By setting an angular frequency G of the high-frequency current Iac high, it is possible to increase the iron loss and increase the heat value. Further, it is possible to increase impedance by the inductance of the motor 8. Therefore, it is possible to suppress the high-frequency current Iac and perform highly efficient heating to the liquid coolant held up in the motor 8 while reducing the loss of the inverter 9. This is suitable for performing coolant heating for a long time during operation standby. Therefore, it is possible to attain energy saving through a reduction in standby power and contribute to prevention of global warming. However, when the high-frequency energization is performed, noise due to electromagnetic sound of the motor 8, an energization frequency of which is within an audible band, is a problem. Therefore, it is necessary to bring the energization frequency close to 20 kilohertz, which is an audible frequency limit. When the small motor 8 having a small iron loss or when the motor 8 having large inductance is used, the heat value with respect to the applied voltage decreases.

Therefore, in this embodiment, when the heating amount H* is large, the liquid coolant is discharged in a short time by performing the direct-current energization to increase the heating amount. When the heating amount H* is small, a reduction in power consumption is attained by performing the high-frequency energization. In this way, the direct-current energization and the high-frequency energization are switched according to the magnitude of the heating amount H*. Consequently, it is possible to surely discharge the liquid coolant held up in the compressor 1 and perform a coolant heating operation that reduces power consumption and contributes to prevention of global warming. Further, because it is possible to reduce time in which the large direct current Idc flows to the inverter 9, it is possible to improve reliability and reduce costs through simplification of a heat radiation structure of the inverter 9.

A method of generating the voltage command values Vu*, Vv*, and Vw* in the voltage-command calculating unit 19 and a method of generating the PWM signals in the PWM-signal generating unit 20 are explained with reference to FIG. 9 to FIG. 11.

When the motor 8 is a three-phase motor, in general, the phases of the U phase, the V phase, and the W phase are different from one another by 120° (=2π/3). Therefore, the voltage command values Vu*, Vv*, and Vw* are defined as cosine waves (sine waves), phases of which are different from one another by 2π/3 as indicated by the following Formulas (1) to (3):

$$Vu^* = V^* \times \cos\theta \qquad (1)$$

$$Vv^* = V^* \times \cos(\theta - (2/3)\pi) \qquad (2)$$

$$Vw^* = V^* \times \cos(\theta + (2/3)\pi) \qquad (3)$$

The voltage-command calculating unit 19 calculates, on the basis of the voltage command V* and the voltage phase command θ, the voltage command values Vu*, Vv*, and Vw* using Formulas (1) to (3) and outputs the voltage command values Vu*, Vv*, and Vw* to the PWM-signal generating unit 20. The PWM-signal generating unit 20 compares the voltage command values Vu*, Vv*, and Vw* and a carrier signal (a reference signal), an amplitude value of which is ±(Vdc/2) at a predetermined frequency, and generates the PWM signals UP, VP, WP, UN, VN, and WN on the basis of a magnitude relation among the voltage command values Vu*, Vv*, and Vw*.

Note that, in Formulas (1) to (3), the voltage commands Vu*, Vv*, and Vw* are calculated by a simple trigonometric function. However, besides the method explained above, the voltage commands Vu*, Vv*, and Vw* can be calculated using other methods such as two-phase modulation, third harmonic superimposition modulation, and spatial vector modulation.

When the voltage command value Vu* is larger than the carrier signal, UP is set to a voltage for turning on the switching element 70a and UN is set to a voltage for turning off the switching element 70d. When the voltage command value Vu* is smaller than the carrier signal, conversely, UP is set to a voltage for turning off the switching element 70a and UN is set to a voltage for turning on the switching element 70d. The same applies to the other signals. VP and VN are determined by comparison of the voltage command value Vv* and the carrier signal. WP and WN are determined by comparison of the voltage command value Vw* and the carrier signal.

In the case of a general inverter, a complementary PWM system is adopted. Therefore, UP and UN, VP and VN, and WP and WN are in a relation of logical inversion from each other. Therefore, there are eight switching patterns in total.

FIG. 9 is a diagram of the eight switching patterns in the heat pump device according to the first embodiment. Note that, in FIG. 9, signs V0 to V7 are attached to voltage vectors generated by the switching patterns. Directions of voltages of the voltage vectors are represented by ±U, ±V, and ±W (when a voltage is not generated, 0). +U indicates a voltage for generating an electric current in a U-phase direction flowing into the motor 8 via the U phase and flowing out from the motor 8 via the V phase and the W phase. −U indicates a voltage for generating an electric current in a −U-phase direction flowing into the motor 8 via the V phase and the W phase and flowing out from the motor 8 via the U phase. The same interpretation applies to ±V and ±W.

By combining the switching patterns shown in FIG. 9, it is possible to cause the inverter 9 to output a desired voltage. For example, in the normal operation mode for performing for performing a normal compression operation, it is a general practice to cause the inverter 9 to operate in a range of several ten hertz to several kilohertz. By setting the voltage phase command θ to a fixed value, it is possible to perform the direct-current energization in the heating operation mode. By changing the voltage phase command θ at high speed than in the normal operation mode, it is possible to perform the high-frequency energization in the heating operation mode.

Figure 10:
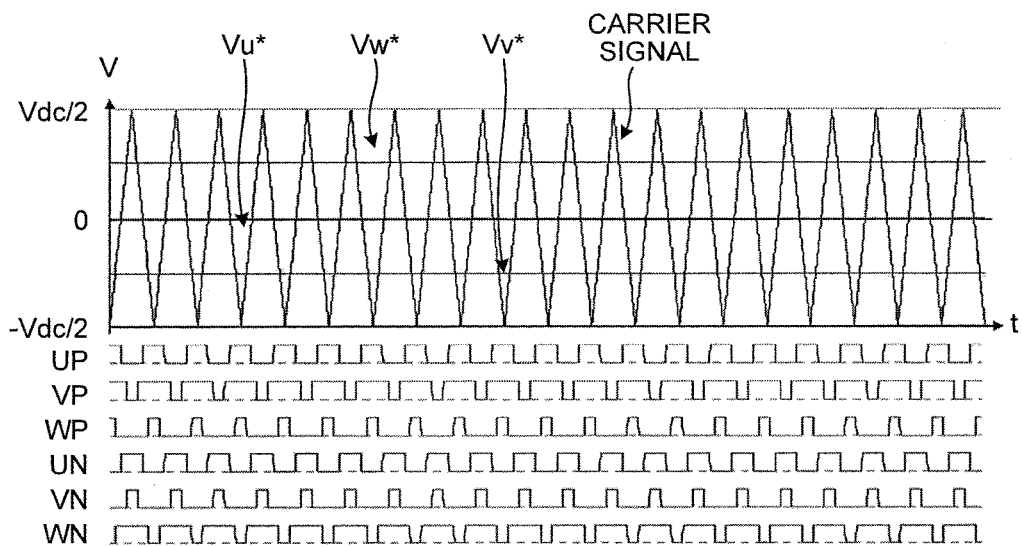
FIG. 10 is a diagram of signal waveforms obtained when direct-current energization is selected in the heat pump device according to the first embodiment.

FIG. 10 is a diagram of signal waveforms obtained when the direct-current energization is selected in the heat pump device according to the first embodiment. When θ is set to 90°, as shown in FIG. 10, Vu*=0, Vv*=−0.5V*, and Vw*=0.5V*. As a result of comparison with the reference signal, PWM signals UP, VP, WP, UN, VN, and WN shown in FIG. 10 are obtained. Voltage vectors V0 (0 volt), V2 (+V volt), V6 (−W volt), and V7 (0 volt) are output. It is possible to feed a direct current to the motor 8.

Figure 11:
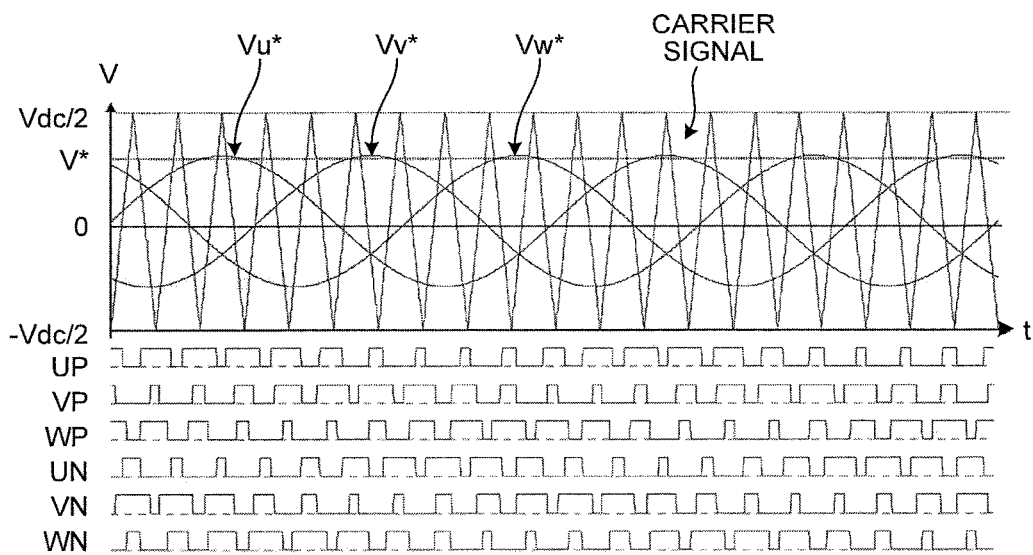
FIG. 11 is a diagram of signal waveforms obtained when high-frequency energization is selected in the heat pump device according to the first embodiment.

FIG. 11 is a diagram of signal waveforms obtained when the high-frequency energization is selected in the heat pump device according to the first embodiment. In the high-frequency energization, the voltage phase command θ is set to 0° to 360°. Therefore, as shown in FIG. 11, Vu*, Vv*, and Vw* are sine (cosine) waves 120° different from one another in phases. As a result of comparison with the reference signal, PWM signals UP, VP, WP, UN, VN, and WN shown in FIG. 11 are obtained. Voltage vectors change according to a change of time. It is possible to feed a high-frequency current to the motor 8.

Figure 12:
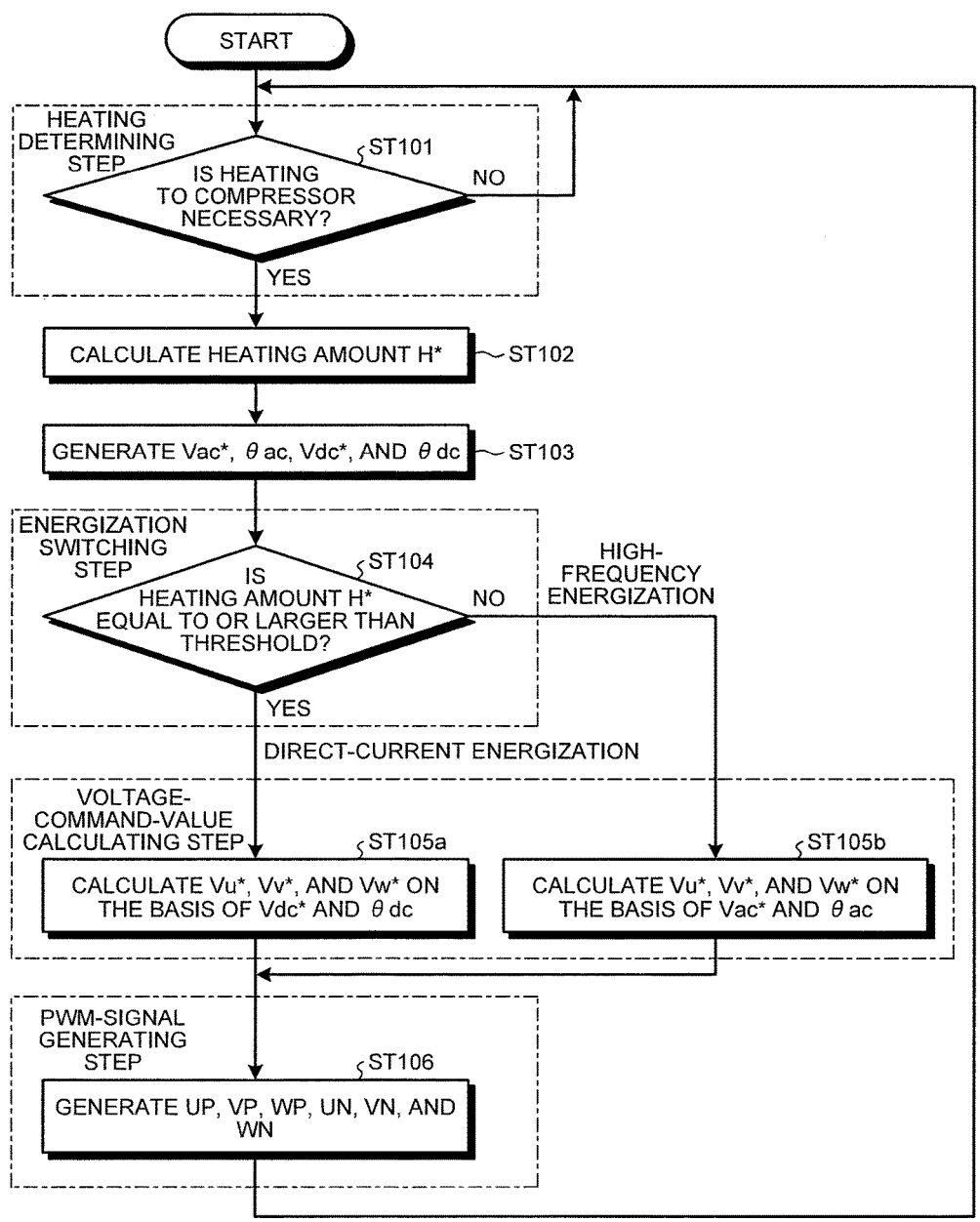
FIG. 12 is a flowchart of coolant heating operation processing in the heat pump device according to the first embodiment.

Coolant heating operation processing in the heat pump device 100 according to the first embodiment is explained with reference to FIG. 12. FIG. 12 is a flowchart of the coolant heating operation processing in the heat pump device according to the first embodiment. As shown in FIG. 12, the coolant heating operation processing in the heat pump device according to the first embodiment is divided into four steps, i.e., a heating determining step, an energization switching step, a voltage-command calculating step, and a PWM-signal generating step.

During operation standby, the heating-necessity determining unit 25 determines whether heating to the compressor 1 is necessary (step ST101). In this embodiment, as explained above, the heating-necessity determining unit 25 determines necessity of heating to the compressor 1 on the basis of the refrigeration stagnation amount, which is the output of the refrigeration stagnation amount output unit 40.

When the heating to the compressor 1 is unnecessary, that is, when the liquid coolant is not held up in the compressor 1 or when it is estimated that the liquid coolant is not held up in the compressor 1 (No at step ST101), the heating-necessity determining unit 25 outputs an OFF signal to the PWM-signal generating unit 20 and repeatedly carries out the heating necessity determining step until the heating to the compressor 1 needs to be performed.

When the heating to the compressor 1 is necessary, that is, when the liquid coolant is held up in the compressor 1 or when it is estimated that the liquid coolant is held up in the compressor 1 (Yes at step ST101), the heating-necessity determining unit 25 outputs an ON signal to the PWM-signal generating unit 20 and instructs the heating-amount calculating unit 26 to start calculation of the heating amount H* necessary for ejecting the liquid coolant held up in the compressor 1.

When instructed to start the calculation of the heating amount H* by the heating-necessity determining unit 25, the heating-amount calculating unit 26 calculates the heating amount H* according to a refrigeration stagnation amount and outputs the heating amount H* to the direct-current-energization-command generating unit 15, the high-frequency-energization-command generating unit 16, and the energization-switching determining unit 27 (step ST102).

Subsequently, the direct-current-energization-command generating unit 15 generates the direct-current voltage command Vdc* and the direct-current voltage phase command θdc according to the heating amount H*. The high-frequency-energization-command generating unit 16 generates the high-frequency voltage command Vac* and the high-frequency voltage phase command θac according to the heating amount H* (step ST103).

Subsequently, the energization-switching determining unit 27 determines whether the heating amount H* is equal to or larger than the threshold or smaller than the threshold (step ST104). When the heating amount H* is equal to or larger than the threshold, the energization-switching determining unit 27 selects the direct-current energization (Yes at step ST104) and controls the energization switching unit 18 such that the direct-current voltage command Vdc* and the direct-current voltage phase command θdc output from the direct-current-energization-command generating unit 15 are output. When the heating amount H* is smaller than the threshold, the energization-switching determining unit 27 selects the high-frequency energization (No at step ST104) and controls the energization switching unit 18 such that the high-frequency voltage command Vac* and the high-frequency voltage phase command θac output from the high-frequency-energization-command generating unit 16 are output.

When the direct-current energization is selected (Yes at step ST104), the voltage-command calculating unit 19 calculates the voltage command values Vu*, Vv*, and Vw* on the basis of the direct-current voltage command Vdc* and the direct-current voltage phase command θdc, which are the direct-current energization commands, and outputs the voltage command values Vu*, Vv*, and Vw* to the PWM-signal generating unit 20 (step ST105a).

When the high-frequency energization is selected (No at step ST104), the voltage-command calculating unit 19 calculates the voltage command values Vu*, Vv*, and Vw* on the basis of the high-frequency voltage command Vac* and the high-frequency voltage phase command θac, which are the high-frequency energization commands, and outputs the voltage command values Vu*, Vv*, and Vw* to the PWM-signal generating unit 20 (step ST105b).

The PWM-signal generating unit 20 generates the PWM signals UP, VP, WP, UN, VN, and WN on the basis of the voltage command values Vu*, Vv*, and Vw* and outputs the PWM signals UP, VP, WP, UN, VN, and WN to the switching elements 70a to 70f of the inverter 9 (step ST106). The processing returns to step ST101. The processing at step ST101 to step ST106 is repeatedly carried out until the operation by the normal operation mode is started.

As explained above, with the heat pump device in the first embodiment, during the operation standby of the compressor, when the liquid coolant is held up in the compressor or when it is estimated that the liquid coolant is held up in the compressor, a heading amount necessary for vaporizing and discharging the liquid coolant held up in the compressor is calculated on the basis of a detected or estimated refrigeration stagnation amount. When the heating amount is equal to or larger than the threshold set in advance, the constraint energization by the direct-current voltage application, that is, the direct-current energization is carried out. When the heating amount is smaller than the threshold, the constraint energization by the high-frequency voltage application, that is, the high-frequency energization is carried out. When the heating amount is large, by performing the direct-current energization in which a large heat value can be obtained, it is possible to surely prevent the coolant from being held up in the compressor in a short time. When the heating amount is small, by performing the high-frequency energization in which highly efficient heating is possible, it is possible to reduce power consumption during the operation standby. In this way, by efficiently carrying out the heating to the compressor according to the necessary heating amount, it is possible to surely prevent the coolant from being held up in the compressor and realize a reduction in standby power. It is possible to attain energy saving through the reduction in the standby power and contribute to prevention of global warming.

Note that, when the direct-current energization is carried out, because the direct current flows to the motor, it is possible to fix the rotor of the motor in a predetermined position through direct-current energization. Therefore, rotation and vibration of the rotor do not occur.

When the high-frequency energization is carried out, if a high-frequency voltage equal to or higher than an operation frequency during a compression operation is applied to the motor, the rotor in the motor cannot follow the high-frequency voltage and rotation and vibration do not occur. Therefore, it is desirable to set the frequency of a voltage output by the inverter to be equal to or higher than the operation frequency during the compression operation.

In general, the operation frequency during the compression operation is about 1 kilohertz at most. Therefore, when the high-frequency energization is carried out during the operation standby of the compressor, a high-frequency voltage equal to or higher than 1 kilohertz, which is the operation frequency during the compression operation, only has to be applied to the motor. If a high-frequency voltage equal to or higher than about 14 kilohertz is applied to the motor, vibration sound of an iron core of the motor comes close to nearly an audible frequency upper limit. Therefore, there is also an effect in a reduction of noise. If a high-frequency voltage is about 20 kilohertz outside an audible frequency, it is possible to further reduce noise. However, when the high-frequency energization is carried out, to secure reliability, it is desirable to apply a high-frequency voltage equal to or lower than a maximum rated frequency of the switching elements in the inverter.

When the motor of the compressor is an embedded magnet-type motor of an IPM (Interior Permanent Magnet) structure, when the high-frequency energization is carried out, a rotor surface, which a high-frequency magnetic flux crosses, is also a heat generating section. Therefore, it is possible to realize quick heating to a compression mechanism through an increase in a coolant contact surface and perform more highly efficient coolant heating.

Note that, in the first embodiment, the example is explained in which the direct-current energization and the high-frequency energization are switched according to the necessary heating amount to vaporize and discharge the liquid coolant held up in the compressor. However, for example, it is also possible to configure the inverter control unit such that the direct current and the high-frequency current simultaneously flow. In that case, it is possible to perform constraint energization having both of the large heat value, which is a merit of the direct-current energization, and the low loss, which is a merit of the high-frequency energization.

Second Embodiment

In the first embodiment, the example is explained in which the high-voltage phase command θ is continuously changed in the range of 0° to 360° in the high-frequency energization. However, in this embodiment, an example is explained in which high-frequency energization equal to a carrier frequency is carried out by inverting a voltage phase in synchronization with the carrier frequency.

Figure 13:
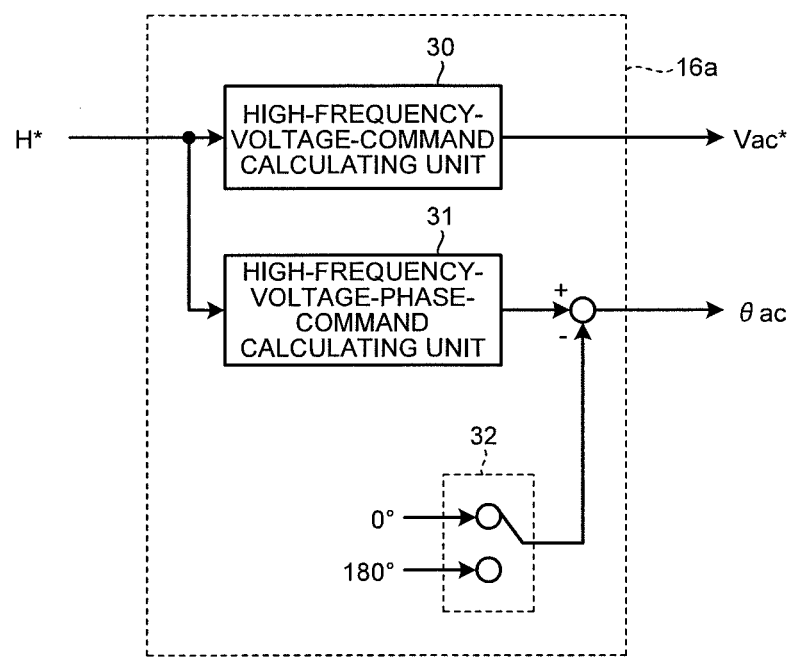
FIG. 13 is a diagram of a configuration example of a high-frequency-energization-command generating unit in a heat pump device according to a second embodiment.
Figure 14:
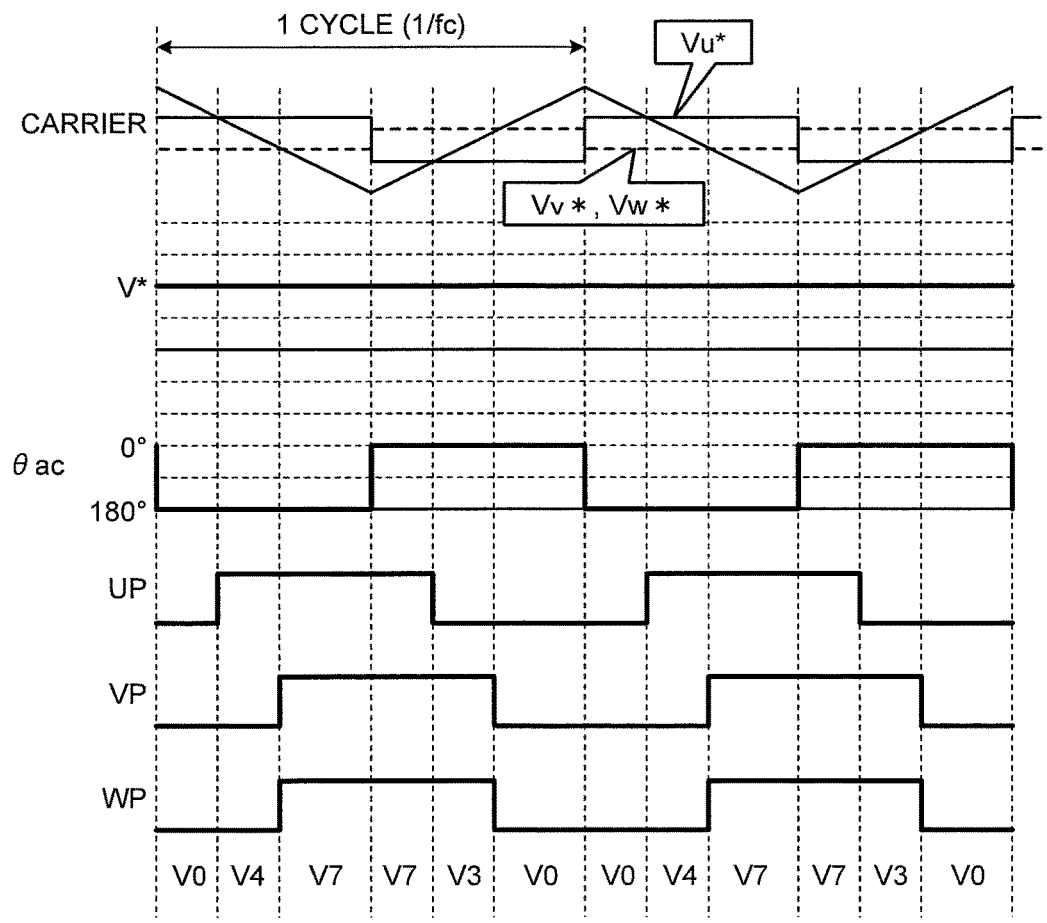
FIG. 14 is a diagram of signal waveforms during high-frequency energization in the heat pump device according to the second embodiment.

FIG. 13 is a diagram of a configuration example of a high-frequency-energization-command generating unit in a heat pump device according to the second embodiment. FIG. 14 is a diagram of signal waveforms during high-frequency energization in the heat pump device according to the second embodiment. Note that the overall configuration of the heat pump device according to the second embodiment is the same as the overall configuration of the heat pump device according to the first embodiment. Therefore, explanation of the overall configuration is omitted.

As shown in FIG. 13, a high-frequency-energization-command generating unit 16a in the second embodiment includes, in addition to the components explained in the first embodiment, a high-frequency-phase switching unit 32 that inverts an output of the high-frequency-voltage-phase-command calculating unit 31 in synchronization with the carrier signal.

The aim of inverting the voltage phase in synchronization with the carrier frequency in the heat pump device 100 according to the second embodiment is explained.

In the case of a general inverter, an upper limit of a carrier frequency, which is the frequency of a carrier signal, is determined by switching speed of switching elements of the inverter. Therefore, it is difficult to output a high-frequency voltage equal to or higher than the carrier frequency, which is a carrier wave. Not that, in the case of a general IGBT (Insulated Gate Bipolar Transistor), an upper limit of switching speed is about 20 kilohertz.

When the frequency of the high-frequency voltage is equal to or higher than about 1/10 of the carrier frequency, it is likely that waveform output accuracy of the high-frequency voltage is deteriorated and an adverse effect such as superimposition of a direct-current component is caused. When the frequency of the high-frequency voltage is set to be equal to or lower than 1/10 of the carrier frequency taking in to account this point, for example, if the carrier frequency is 20 kilohertz, the frequency of the high-frequency voltage is equal to or lower than 2 kilohertz and is within an audible frequency band. Therefore, noise due to electromagnetic sound of the motor is a problem.

Therefore, in this embodiment, a voltage phase (hereinafter referred to as "reference phase") output from the high-frequency-voltage-phase-command calculating unit 31 is set to a fixed value. As shown in FIG. 14, an output of the high-frequency-voltage-phase-command calculating unit 31 is inverted 180° in a period from a peak of a crest to a peak of a valley, that is, in one cycle of a carrier frequency fc (1/fc). With such a configuration, the voltage commands Vu*, Vv*, and Vw* inversed in synchronization with the carrier signal are obtained in the voltage-command calculating unit 19 in a later stage. The highly accurate PWM signals UP, VP, WP, UN, VN, and WN synchronizing with the carrier signal are generated in the PWM-signal generating unit 20 in a still later stage. At this point, voltage vectors change in the order of V0 (UP=VP=WP=0), V4 (UP=1, VP=WP=0), V7 (UP=VP=WP=1), V3 (UP=0, VP=WP=1), V0 (UP=VP=WP=0), . . . .

Figure 15:
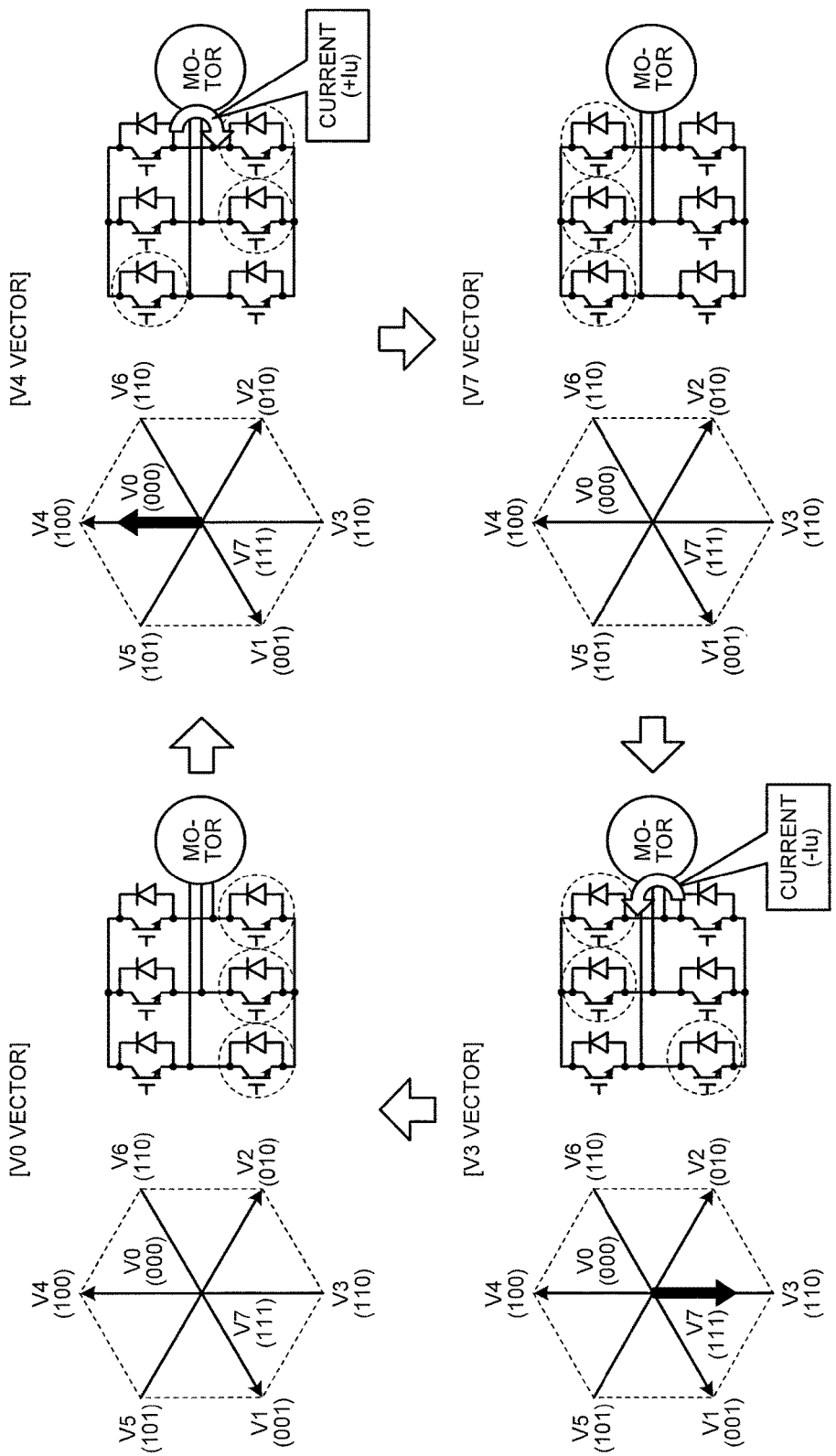
FIG. 15 is a diagram of ON/OFF states of switching elements in an inverter corresponding to voltage vectors.

FIG. 15 is a diagram of ON/OFF states of the switching elements in the inverter corresponding to the voltage vectors. Circuit diagrams shown in FIG. 15 indicate that the switching elements surrounded by broken lines are ON and the other switching elements are OFF. A rotating direction of a thick arrow indicating the changing order of the voltage vectors (a rotating direction of the voltage vectors V0→V4→V7→V3→0 . . . ) corresponds to an example shown in FIG. 14.

In an example shown in FIG. 15, the PWM signals UP, VP, WP, UN, VN, and WN go around four circuit states shown in FIG. 15 once in one carrier cycle. Consequently, an electric current, one cycle of which is one carrier cycle, is fed to the motor 8.

As shown in FIG. 15, when the V0 vector and the V7 vector are applied, lines of the motor 8 are in a short-circuit state and a voltage is not output. In this case, energy accumulated in the inductance of the motor 8 changes to an electric current and flows through a short circuit. When the V4 vector is applied, an electric current (+Iu) in a U-phase direction flowing into the motor 8 via a U phase and flowing out from the motor via a V phase and a W phase flows. When the V3 vector is applied, an electric current (−Iu) in a −U-phase direction flowing into the motor 8 via the V phase and the W phase and flowing out from the motor 8 via the U phase flows to the winding wire of the motor 8. That is, when the V4 vector is applied and when the V3 vector is applied, the electric currents in the opposite directions flow to the winding wire of the motor 8. Because the voltage vectors change in the order of V0, V4, V7, V3, V0, . . . , +Iu and −Iu alternately flow to the winding wire of the motor 8. As a result, as shown in FIG. 14, the V4 vector and the V3 vector appear in the one carrier cycle. Therefore, it is possible to apply a high-frequency voltage synchronizing with the frequency of the carrier signal to the winding wire of the motor 8.

The V4 vector and the V3 vector are alternately output. +Iu and −Iu alternately flow to the winding wire of the motor 8. Therefore, positive torque and negative torque are instantaneously switched. Therefore, the positive torque and the negative torque are offset. It is possible to apply a voltage that suppresses vibration of the rotor.

As explained above, with the heat pump device in the second embodiment, the high-frequency energization equal to the carrier frequency is carried out by setting the reference phase output from the high-frequency-voltage-phase-command calculating unit to the fixed value and inverting the reference phase in synchronization with the frequency of the carrier signal. Therefore, it is possible to apply highly accurate high-frequency voltage synchronizing with the frequency of the carrier signal to the winding wire of the motor and suppress noise due to electromagnetic sound of the motor.

By inverting the reference phase between 0° and 180°, the V4 vector and the V3 vector are alternately output via the V0 vector and the V7 vector and the direction of the U-phase current is instantaneously switched. That is, the positive torque and the negative torque are instantaneously switched and offset. Therefore, it is possible to suppress vibration of the rotor.

Third Embodiment

In the second embodiment, the example is explained in which the voltage phase (the reference phase) output from the high-frequency-voltage-phase-command calculating unit is set to the fixed value. However, in this embodiment, an example is explained in which the reference phase is changed according to elapse of time. Note that the overall configuration of a heat pump device according to the third embodiment, the configuration of an inverter control unit, and the configuration of a constraint-energization control unit are the same as the overall configuration of the heat pump device according to the first embodiment. Therefore, explanation of the configurations is omitted. The configuration of a high-frequency-energization-command generating unit in the heat pump device according to the third embodiment is the same as the configuration of the high-frequency-energization-command generating unit in the heat pump device according to the second embodiment. Therefore, explanation of the configuration is omitted.

Figure 16:
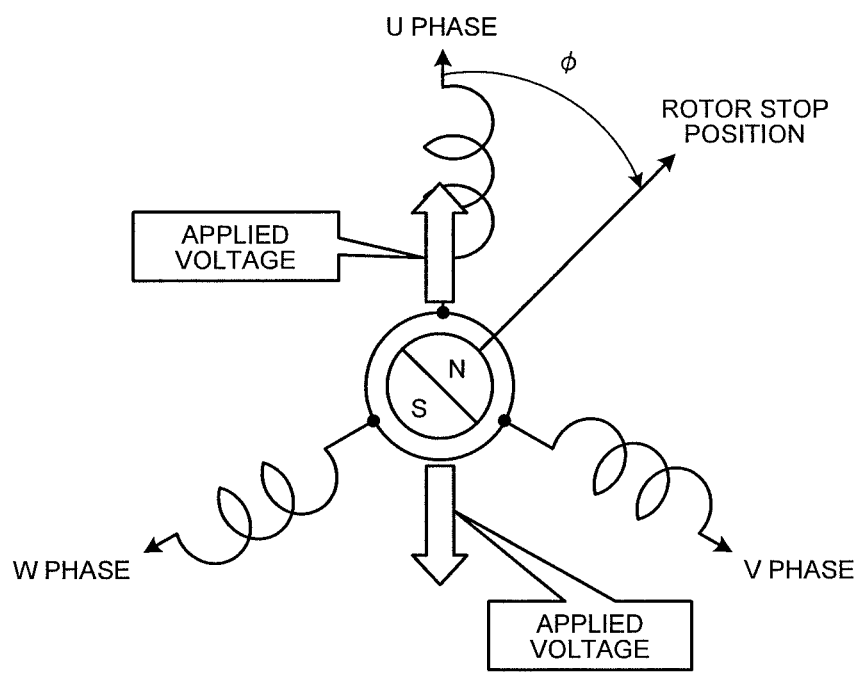
FIG. 16 is a diagram of an example of a rotor stop position of an IPM motor during the high-frequency energization.

FIG. 16 is a diagram of an example of a rotor stop position of an IPM motor during high-frequency energization. As shown in FIG. 16, when the motor 8 is the IPM motor (Interior Permanent Magnet Motor), a rotor stop position of the motor 8 is represented by the magnitude of an angle ϕ at which the direction of a N pole of the rotor shifts from a U-phase direction.

Figure 17:
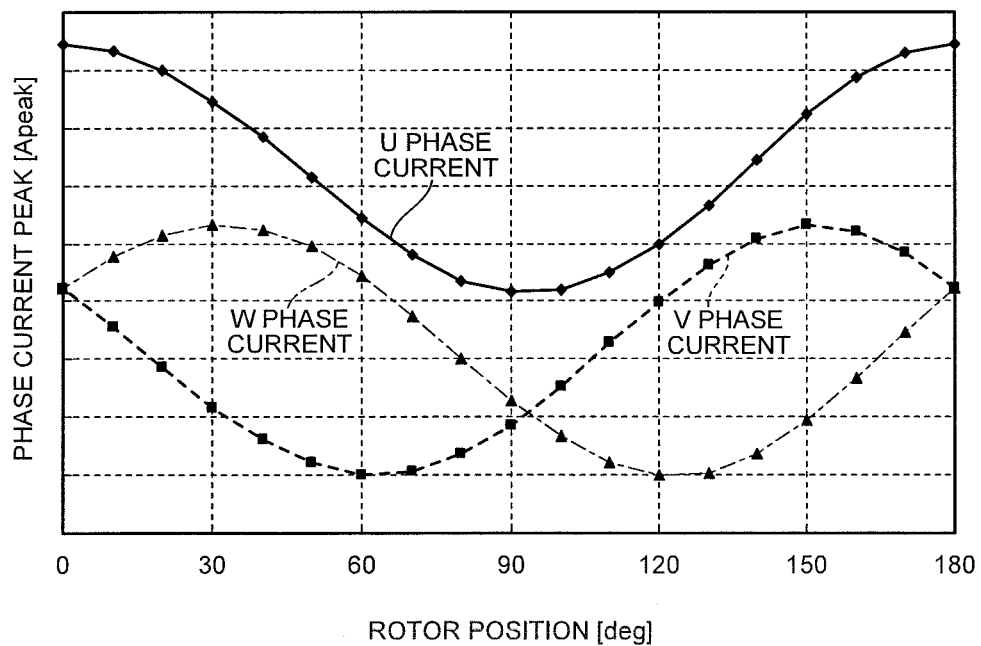
FIG. 17 is a diagram of a relation between a rotor position and phase currents.

FIG. 17 is a diagram of a relation between a rotor position and phase currents. In the case of the IPM motor, a winding wire inductance value during the high-frequency energization depends on the rotor position. Therefore, winding wire impedance represented by a product of an electrical angel frequency ω and the winding wire inductance value fluctuates according to the rotor position. Therefore, when direct-current energization is carried out during operation standby, even if the same voltage is applied, an electric current flowing to the winding wire of the motor 8 fluctuates depending on a rotor stop position and a heating amount changes. As a result, depending on the rotor stop position, it is likely that a lot of electric power is consumed to obtain a necessary heating amount.

Therefore, in this embodiment, a rotor is evenly applied to the rotor by changing a voltage phase (a reference phase=θf) output from the high-frequency-voltage-phase-command calculating unit 31 according to elapse of time.

FIG. 18 is a diagram of an applied voltage applied when the reference phase θf is changed. In an example shown in FIG. 18(a), the reference phase θf=0°. In this case, the high-frequency-voltage-phase command θac, which is the output of the high-frequency-energization-command generating unit 16a, is switched between 0° and 180°. In an example shown in FIG. 18(b), θf=45°. In this case, θac is switched between 45° and 225°. In an example shown in FIG. 18(c), θf=90°. In this case, θac is switched between 90° and 270°. In an example shown in FIG. 18(d), θf=135°. In this case, θac is switched between 135° and 315°.

That is, as shown in FIG. 18, by changing the reference phase θf 45° at a time according to elapse of a predetermined time, the high-frequency voltage phase command θac inverted in synchronization with the carrier signal also changes 45° at a time. Therefore, it is possible to evenly apply a voltage to the rotor irrespective of the rotor stop position and efficiently heat the liquid coolant held up in the compressor 1.

FIG. 19 is a diagram of phase current waveforms obtained when the reference phase θf is 0°, 30°, and 60°. FIG. 19(a) shows phase current waveforms obtained when θf=0°. FIG. 19(b) shows phase current waveforms obtained when θf=30°. FIG. 19(c) shows phase current waveforms obtained when θf=60°.

When θf=0°, as shown in FIG. 15, only one other voltage vector (a voltage vector in which one switching element on a positive voltage side and two switching elements on a negative voltage side or two switching elements on the positive voltage side and one switching element on the negative voltage side are in an ON state) is generated between the V0 vector and the V7 vector. In this case, as shown in FIG. 19(a), the phase current waveforms are formed in a trapezoidal shape and an electric current having few harmonic components is obtained.

When θf=60°, as in the case of θf=0°, only one other voltage vector is generated between the V0 vector and the V7 vector. Therefore, as shown in FIG. 19(c), the phase current waveforms are formed in a trapezoidal shape and an electric current having few harmonic components is obtained.

However, when θf=30°, different two voltage vectors are generated between the V0 vector and the V7 vector. As shown in FIG. 19(b), the phase current waveforms are distorted and an electric current having many harmonic components is obtained. It is likely that the distortion of the phase current waveforms causes motor noise, motor shaft vibration, and the like.

That is, if the reference phase θf is switched at an angle n times (n is an integer equal to or larger than 0) as large as 60°, the high-frequency voltage phase command θac is also always a multiple of 60° and is always switched between 0° and 180°, between 60° and 240°, and between 120° and 300°. Consequently, only one other voltage vector is generated between the V0 vector and the V7 vector. Therefore, the phase current waveforms are formed in a trapezoidal shape and an electric current having few harmonic components is obtained. On the other hand, when the reference phase θf is switched at an angle other than the angle n times as large as 60°, the high-frequency voltage phase command θac is not a multiple of 60°. Therefore, two other voltage vectors are generated between the V0 vector and the V7 vector. The phase current waveforms are distorted and an electric current having many harmonic components is obtained. Therefore, it is desirable to change the reference phase θf at a multiple of 60° such as 00 60°, 120°, and the like.

As explained above, with the heat pump device in the third embodiment, the reference phase output from the high-frequency-voltage-phase-command calculating unit is changed at every predetermined time, When the high-frequency energization is carried out, an energization phase of a high-frequency alternating-current voltage is changed at every predetermined time. Therefore, it is possible to eliminate the influence of an inductance characteristic due to the rotor stop position and efficiently and uniformly heat the liquid coolant held up in the compressor irrespective of the rotor stop position.

If the reference phase is changed at a multiple of 60° at every predetermined time, it is possible to suppress high-frequency components of the phase current waveforms and prevent occurrence of motor noise and motor shaft vibration.

Fourth Embodiment

In this embodiment, an air conditioner, a heat pump water heater, a refrigerator, and a freezing machine to which the heat pump device described in the first to third embodiments can be applied are explained.

A more detailed configuration of a refrigerating cycle and operations in a normal operation mode of the air conditioner, the heat pump water heater, the refrigerator, and the freezing machine according to the fourth embodiment are explained with reference to FIG. 20 and FIG. 21.

Figure 20:
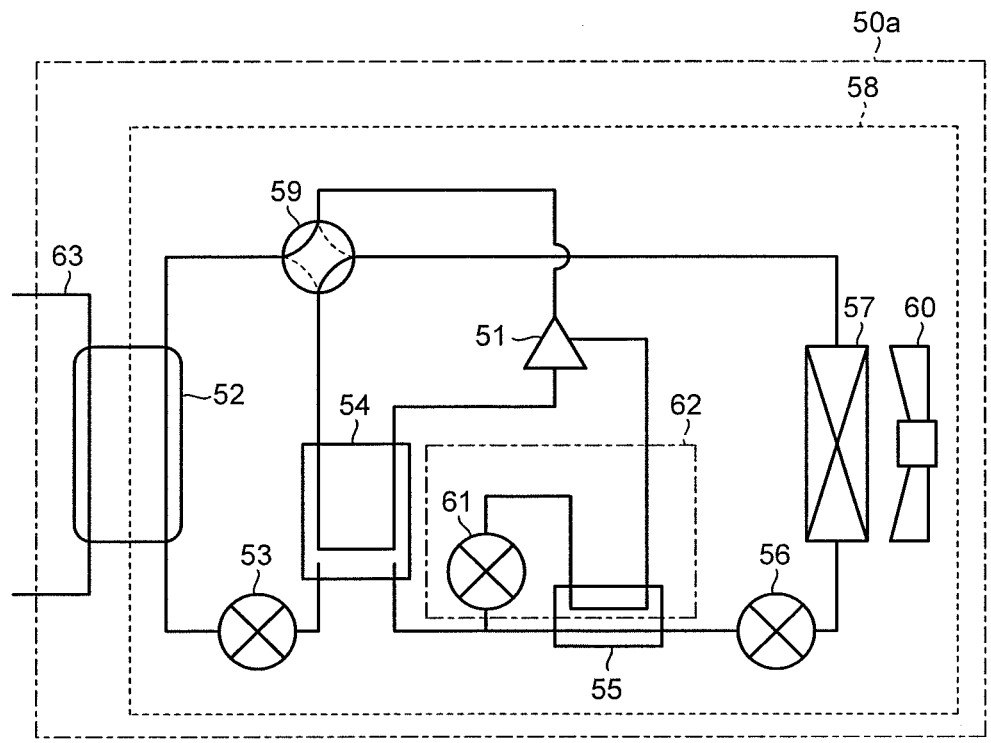
FIG. 20 is a diagram of a configuration example of a refrigerating cycle according to a fourth embodiment.

FIG. 20 is a diagram of a configuration example of the refrigerating cycle according to the fourth embodiment. FIG. 21 is a Mollier chart of a state transition of a coolant in the refrigerating cycle shown in FIG. 20. In FIG. 21, the abscissa indicates a specific enthalpy and the ordinate indicates a coolant pressure.

In a refrigerating cycle 50a according to the fourth embodiment, a compressor 51, a heat exchanger 52, an expansion mechanism 53, a receiver 54, an internal heat exchanger 55, an expansion mechanism 56, and a heat exchanger 57 are sequentially connected by a pipe to form a main coolant circuit 58 through which a coolant circulates. Note that, in the main coolant circuit 58, a four-way valve 59 is provided on a discharge side of the compressor 51. A circulating direction of the coolant can be switched. A fan 60 is provided near the heat exchanger 57. The compression mechanism 7 that compresses the coolant and the motor 8 that causes the compression mechanism 7 to operate are provided on the inside of the compressor 51. Further, the refrigerating cycle 50a includes an injection circuit 62 that connects, with a pipe, the receiver 54 and the internal heat exchanger 55 to an injection pipe of the compressor 51. An expansion mechanism 61 and the internal heat exchanger 55 are sequentially connected to the injection circuit 62.

A water circuit 63, through which water circulates, is connected to the heat exchanger 52. Note that a device that makes use of water such as a water heater (not shown in the figure), a radiator (not shown in the figure), or a radiator for floor heating (not shown in the figure) is connected to the water circuit 63.

First, an operation during a heating operation in the refrigerating cycle 50a is explained. During the heating operation, the four-way valve 59 is set in a solid line direction in FIG. 20. Note that the heating operation includes not only a heating operation in the air conditioner but also a water heating operation for applying heat to water and making hot water in a heat pump water heart.

Figure 21:
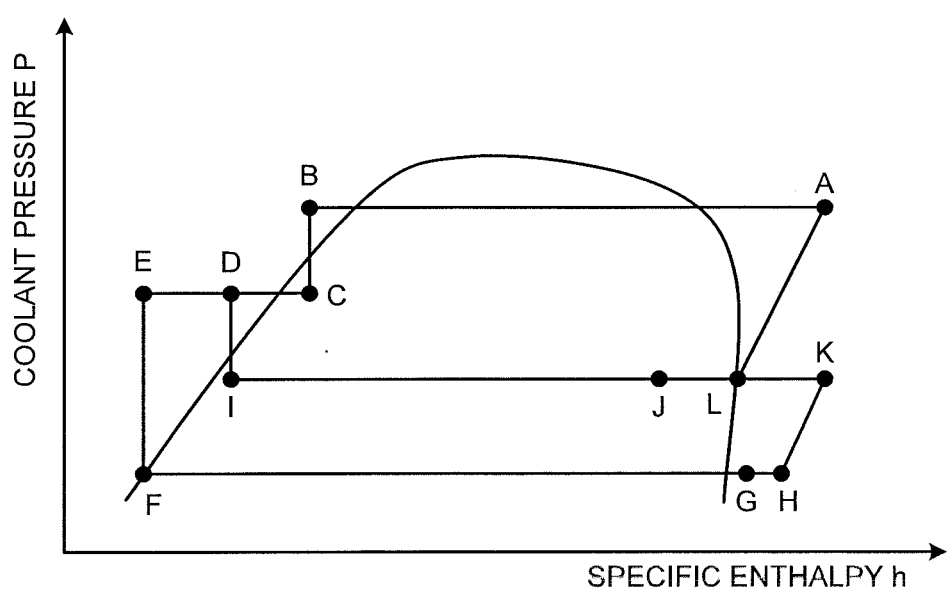
FIG. 21 is a Mollier chart of a state transition of a coolant in the refrigerating cycle shown in FIG. 20.

In FIG. 21, a gas-phase coolant (an A point in FIG. 21) heated and compressed to high temperature and high pressure by the compressor 51 is discharged from the compressor, subjected to heat exchange by the heat exchanger 52 functioning as a condenser and a radiator, and liquefied (a B point in FIG. 21). At this point, the water circulating through the water circuit 63 is warmed by heat radiated from the coolant and used for the heating operation in the air conditioner and the water heating operation in the heat pump water heater.

A liquid-phase coolant liquefied by the heat exchanger 52 is decompressed and changed to a gas-liquid two-phase state by the expansion mechanism 53 (a C point in FIG. 21). The coolant changed to the gas-liquid two-phase state by the expansion mechanism 53 is subjected to heat exchange with the coolant sucked into the compressor 51 and is cooled and liquefied by the receiver 54 (a D point in FIG. 21). The liquid-phase coolant liquefied by the receiver 54 is divided to flow to the main coolant circuit 58 and the injection circuit 62.

The liquid-phase coolant flowing through the main coolant circuit 58 is subjected to heat exchange with the coolant decompressed and changed to the gas-liquid two-phase state by the expansion mechanism 61 and flowing through the injection circuit 62 and is further cooled by the internal heat exchanger 55 (an E point in FIG. 21). The liquid-phase coolant cooled by the internal heat exchanger 55 is decompressed and changed to the gas-liquid two-phase state by the expansion mechanism 56 (an F point in FIG. 21). The coolant changed to the gas-liquid two-phase state by the expansion mechanism 56 is subjected to heat exchange with the outdoor air by the heat exchanger 57 functioning as an evaporator and is heated (a G point in FIG. 21). The coolant heated by the heat exchanger 57 is further heated by the receiver 54 (an H point in FIG. 21) and sucked into the compressor 51.

On the other hand, as explained above, the coolant flowing through the injection circuit 62 is decompressed by the expansion mechanism 61 (an I point in FIG. 21) and subjected to heat exchange by the internal heat exchanger 55 (a J point in FIG. 21). The coolant (an injection coolant) in the gas-liquid two-phase state subjected to the heat exchange by the internal heat exchanger 55 flows into the compressor 51 from the injection pipe of the compressor 51 while keeping the gas-liquid two-phase state.

In the compressor 51, the coolant sucked from the main coolant circuit 58 (the H point in FIG. 21) is compressed and heated to an intermediate pressure (a K point in FIG. 21). The injection coolant (the J point in FIG. 21) merges with the coolant compressed and heated to the intermediate pressure (the K point in FIG. 21) and the temperature of the coolant falls (an L point in FIG. 21). The coolant having the low temperature (the L point in FIG. 21) is further compressed and heated to high temperature and high pressure and discharged (the A point in FIG. 21).

Note that, when the injection operation is not performed, the expansion mechanism 61 is fully closed. That is, when the injection operation is performed, an opening degree of the expansion mechanism 61 is larger than a predetermined opening degree. However, when the injection operation is not performed, the opening degree of the expansion mechanism 61 is set smaller than the predetermined opening degree. Consequently, the coolant does not flow into the injection pipe of the compressor 51. Note that the opening degree of the expansion mechanism 61 is controlled by electronic control by a control unit (not shown in the figure) such as a microcomputer.

An operation during a cooling operation in the refrigerating cycle 50a is explained. During the cooling operation, the four-way valve 59 is set in a broken line direction in FIG. 20. Note that the cooling operation includes not only a cooling operation in the air conditioner but also depriving heat from water to make cold water and a freezing operation in the freezing machine.

The gas-phase coolant heated and compressed to high temperature and high pressure by the compressor 51 (the A point in FIG. 21) is discharged from the compressor 51, subjected to the heat exchange by the heat exchanger 57 functioning as a condenser and a radiator, and liquefied (the B point in FIG. 21). The liquid-phase coolant liquefied by the heat exchanger 57 is decompressed and changed to the gas-liquid two-phase state by the expansion mechanism 56 (the C point in FIG. 21). The coolant changed to the gas-liquid two-phase state by the expansion mechanism 56 is subjected to the heat exchange by the internal heat exchanger 55, cooled, and liquefied (the D point in FIG. 21). The internal heat exchanger 55 causes the coolant changed to the gas-liquid two-phase state by the expansion mechanism 56 and the coolant obtained by decompressing, with the expansion mechanism 61, the liquid-phase coolant liquefied by the internal heat exchanger 55 and changing the liquid-phase coolant to the gas-liquid two-phase state (the I point in FIG. 21) to perform heat exchange. The liquid-phase coolant subjected to the heat exchange by the internal heat exchanger 55 is divided to flow to the main coolant circuit 58 and the injection circuit 62.

The liquid-coolant flowing through the main coolant circuit 58 is subjected to the heat exchange with the coolant sucked into the compressor 51 and further cooled by the receiver 54 (the E point in FIG. 21). The liquid-phase coolant cooled by the receiver 54 is decompressed and changed to the gas-liquid two-phase state by the expansion mechanism 53 (the F point in FIG. 21). The coolant changed to the gas-liquid two-phase state by the expansion mechanism 53 is subjected to the heat exchange and heated by the heat exchanger 52 functioning as an evaporator (the G point in FIG. 21). At this point, the coolant absorbs heat, whereby the water circulating through the water circuit 63 is cooled and used for the cooling operation in the air conditioner and the freezing operation in the freezing machine.

The coolant heated by the heat exchanger 52 is further heated by the receiver 54 (the H point in FIG. 21) and sucked into the compressor 51.

On the other hand, as explained above, the coolant flowing through the injection circuit 62 is decompressed by the expansion mechanism 61 (the I point in FIG. 21) and subjected to the heat exchange by the internal heat exchanger 55 (the J point in FIG. 21). The coolant (the injection coolant) in the gas-liquid two-phase state subjected to the heat exchange by the internal heat exchanger 55 flows into the compressor 51 from the injection pipe of the compressor 51 while keeping the gas-liquid two phase state.

A compression operation in the compressor 51 is the same as the compression operation during the heating operation. Therefore, explanation of the compression operation is omitted.

Note that, when the injection operation is not performed, as in the heating operation, the expansion mechanism 61 is fully closed to prevent the coolant from flowing into the injection pipe of the compressor 51.

In the above explanation, the heat exchanger 55 is explained as a heat exchanger of a plate-type heat exchanger that causes the coolant and the water circulating through the water circuit 63 to perform the heat exchange. The heat exchanger 52 is not limited to this and can cause the coolant and the air to perform heat exchange.

The water circuit 63 can be a circuit through which other fluid circulates rather than the circuit through which the water circulates.

As explained above, with the air conditioner, the heat pump water heater, the refrigerator, and the freezing machine in the fourth embodiment, by applying the heat pump device described in the first to third embodiments, it is possible to obtain the effects explained in the first to third embodiments, attain energy saving through a reduction in standby power, and contribute to prevention of global warming.

Note that, as the switching elements configuring the inverter in the embodiments and the reflux diodes connected to the switching elements in parallel, in general, an Si semiconductor made of silicon (Si) is mainly used. However, a wide band gap (WBG) semiconductor made of silicon carbide (SiC), gallium nitride (GaN), or diamond can be used.

Switching elements and diode elements formed by such a WBG semiconductor have high voltage resistance and also has high allowable current density. Therefore, it is possible to reduce the switching elements and the diode elements in size. By using the switching elements and the diode elements reduced in size, it is possible to reduce a semiconductor module incorporating these elements in size.

The switching elements and the diode elements formed by such a WBG semiconductor also have high heat resistance. Therefore, it is possible to reduce heat radiation fins of a heat sink in size and change a water cooling section to air cooling. Therefore, it is possible to further reduce the semiconductor module in size.

Further, the switching elements and the diode elements formed by such a WBG semiconductor have a low power loss. Therefore, it is possible to improve efficiency of the switching elements and the diode elements. Further, it is possible to improve efficiency of the semiconductor module.

Switching at a higher frequency is possible. Therefore, it is possible to feed an electric current having a higher frequency to the motor. It is possible to reduce an electric current flowing to the inverter through a reduction in a winding wire current by an increase in the winding wire impedance of the motor. Therefore, it is possible to obtain the heat pump device having higher efficiency. Further, because it is easy to increase a frequency, there is an advantage that, for example, it is possible to set a frequency equal to or higher than the audible frequency band and it is easy to take measures against noise.

A power loss is small in the direct-current energization as well. Therefore, heat generation is small. Moreover, even if a large current flows, because heat resistance performance is high, there is an advantage that, for example, it is possible to obtain a heat pump device having high reliability.

Note that it is desirable that both of the switching elements and the diode elements are formed by the WBG semiconductor. However, at least one of the elements can be formed by the WBG semiconductor. It is possible to obtain the effects in the embodiments.

Besides the WBG semiconductor, when a MOSFET (Metal-Oxide-Semiconductor Field-Effect Transistor) of a super junction structure known as a high-efficiency switching element is used, it is also possible to obtain the same effects.

In a compressor of a scroll mechanism, high-pressure relief of a compression chamber is difficult. Therefore, compared with compressors of other systems, it is highly likely that excessively large stress is applied to a compression mechanism when liquid compression is performed. However, in the heat pump device according to the embodiments, it is possible to efficiently heat the compressor and suppress the liquid coolant from being held up in the compressor. Therefore, because it is possible to prevent the liquid compression, the heat pump device is also effective when the compressor of the scroll mechanism is used.

Further, when the high-frequency energization is carried out, in the case of a heating device exceeding a frequency of 10 kilohertz and an output of 50 watts, the heating device is sometimes restricted by law. Therefore, the voltage command V* can be adjusted in advance such that the power does not exceed 50 watts. A flowing current and a voltage can be detected to perform feedback control such that the power is equal to or smaller than 50 watts.

Note that the inverter control unit can be configured by a discrete system of a CPU (Central Processing Unit), a DSP (Digital Signal Processor), or a microcomputer. Besides, the inverter control unit can be configured by an electric circuit element such as an analog circuit or a digital circuit.

The configurations explained in the embodiments are examples of the configuration of the present invention. It goes without saying that it is also possible to combine the configurations with other publicly-known technologies and it is also possible to change the configurations to, for example, omit a part thereof without departing from the spirit of the present invention.

The invention claimed is:

1. A heat pump device comprising:
   a compressor including a compression mechanism that compresses a refrigerant and a motor that drives the compression mechanism;
   a heat exchanger;
   an inverter that applies a predetermined voltage to the motor; and
   an inverter control unit that generates a driving signal for driving the inverter, wherein:
   the inverter control unit includes:
      an energization control unit that, during a standby operation of the compressor, carries out energization of the motor by using at least one of a direct current and a frequency and heats a refrigerant in the compressor;
   the energization control unit includes:
      a refrigerant stagnation amount output unit that estimates or detects and outputs a refrigerant stagnation amount to the compressor,
      a heating-amount calculating unit that calculates a heating amount corresponding to the refrigerant stagnation amount, and
      an energization-switching unit that switches, on the basis of a first temperature around the compressor and a second temperature of the compressor itself and the heating amount, between the direct-current energization and the frequency energization; and
   the inverter control unit, including the energization control unit, is configured by one of a Central Processing Unit, a Digital Signal Processor, a microcomputer, and an electric circuit element.

2. The heat pump device according to claim 1, wherein the energization-switching unit compares a threshold amount of heat set in advance and the heating amount, and, when the heating amount is equal to or larger than the threshold amount, carries out the direct-current energization, and, when the heating amount is smaller than the threshold amount, carries out the frequency energization.

3. The heat pump device according to claim 2, further comprising:
   a frequency-energization-command generating unit that generates, on the basis of table data which defines a relation between the heating amount and a frequency voltage command, a frequency voltage command, and that generates a frequency voltage phase command in which a frequency voltage phase is continuously changed in a range of 0° to 360° for carrying out the frequency energization, wherein:
   the frequency-energization-command generating unit inverts the frequency voltage phase command in synchronization with a reference signal of the inverter, and
   the frequency-energization-command generating unit is configured by the one of the Central Processing Unit, the Digital Signal Processor, the microcomputer, and the electric circuit element.

4. The heat pump device according to claim 3, wherein the frequency-energization-command generating unit changes, every predetermined time, a reference phase for inverting the frequency voltage phase command.

5. The heat pump device according to claim 4, wherein the frequency-energization-command generating unit changes the reference phase at a multiple of 60° every predetermined time.

6. The heat pump device according to claim 1, wherein the refrigerant stagnation amount output unit detects an atmospheric temperature and a temperature of the compressor, and estimates the refrigerant stagnation amount on the basis of a relation between an atmospheric temperature and a temperature of the compressor.

7. The heat pump device according to claim 1, wherein the refrigerant stagnation amount output unit senses a liquid amount or a liquid surface of a liquid refrigerant held up on an inside of the compressor by using a capacitance sensor for measuring a liquid amount or a sensor for measuring a distance between an upper part of the compressor and a liquid surface of the refrigerant, and detects the refrigerant stagnation amount.

8. The heat pump device according to claim 1, wherein the heating-amount calculating unit calculates the heating amount according to a characteristic of the compressor.

9. The heat pump device according to claim 1, wherein at least one of switching elements constituting the inverter or a diode constituting the inverter is formed by a wide band gap semiconductor.

10. The heat pump device according to claim 9, wherein the wide band gap semiconductor is silicon carbide, a gallium nitride material, or diamond.

11. An air conditioner comprising the heat pump device according to claim 1.

12. A heat pump water heater comprising the heat pump device according to claim 1.

13. A refrigerator comprising the heat pump device according to claim 1.

14. A freezing machine comprising the heat pump device according to claim 1.

* * * * *